United States Patent [19]

Shinozaki et al.

[11] Patent Number: 5,438,100
[45] Date of Patent: Aug. 1, 1995

[54] OLEFIN POLYMER COMPOSITION

[75] Inventors: Tetsunori Shinozaki; Mamoru Kioka, both of Yamaguchi, Japan

[73] Assignee: Mitsui Petrochemical Industries, Ltd., Tokyo, Japan

[21] Appl. No.: 182,403

[22] Filed: Jan. 18, 1994

Related U.S. Application Data

[63] Continuation-in-part of Ser. No. 82,054, Jun. 25, 1993, abandoned, which is a continuation-in-part of Ser. No. 929,518, Aug. 14, 1992, abandoned.

[30] Foreign Application Priority Data

Aug. 14, 1991 [JP] Japan ................. 3-204464
Aug. 14, 1991 [JP] Japan ................. 3-204465
Aug. 14, 1991 [JP] Japan ................. 3-204466
Aug. 14, 1991 [JP] Japan ................. 3-204467

[51] Int. Cl.$^6$ ............................... C08L 47/00
[52] U.S. Cl. ................... 525/240; 525/232; 525/268
[58] Field of Search ............... 525/232, 240, 86, 268

[56] References Cited

U.S. PATENT DOCUMENTS 5,015,694 5/1991 Milani et al. .
5,021,382 6/1991 Malpass, Jr. .
5,041,491 8/1991 Turke .
5,262,228 11/1993 Kohyama et al. .

FOREIGN PATENT DOCUMENTS 0354893 2/1990 European Pat. Off. .
0401993 12/1990 European Pat. Off. .

*Primary Examiner*—Vasu S. Jagannathan
*Attorney, Agent, or Firm*—Sherman and Shalloway

[57] ABSTRACT

The olefin polymer composition according to the invention comprises [I] an α-olefin/polyene copolymer-containing polymer in an amount of 0.005 to 99 by weight, said α-olefin/polyene copolymer-containing polymer comprising (i) an α-olefin/polyene copolymer and (ii) a polypropylene, and [II] a polymer of α-olefin having 3 or more carbon atoms in an amount of 1 to 99.995% by weight. The olefin polymer composition comprising the α-olefin/polyene copolymer-containing polymer [I] and the olefin polymer [II] has a high melt tension and an excellent moldability in an inflation molding, and further it can be molded into a large sized container, etc. by means of a blow molding or the like.

16 Claims, 1 Drawing Sheet

OLEFIN POLYMER COMPOSITION

This application is a continuation-in-part of application Ser. No. 08/082,054, filed Jun. 25, 1993; which is continuation-in-part of application Ser. No. 07/929,518, filed Aug. 14, 1992 both abandoned.

FIELD OF THE INVENTION

The present invention relates to an olefin polymer composition, and more particularly to an olefin polymer composition comprising an $\alpha$-olefin/polyene copolymer-containing polymer and having a high melt tension.

BACKGROUND OF THE INVENTION

Olefin polymers such as high-density polyethylene, linear low-density polyethylene, polypropylene are excellent in not only transparency but also mechanical strength such as rigidity and impact strength, and have been conventionally molded into films by means of inflation molding, injection molding, extrusion molding, etc.

Such olefin polymers as mentioned above generally are low in the melt tension (MT), so that they are difficultly molded into large capacity containers (e.g., bottles) for example by a blow molding or difficultly molded into liners of electrical appliances for example by a vacuum molding. By those restrictions in the molding processes, the resulting molded products are also restricted. That is, the use applications of the olefin polymers are restricted in spite that they have various excellent properties.

Further, as for polypropylene, there are such problems that a phenomenon of drawdown occurs and molding conditions are restricted when propylene is molded into a film by an inflation molding, because of its low melt tension. For coping with those problems, a method of adding a high-pressure low-density polyethylene or the like to polypropylene is carried out in the conventional inflation molding process to increase the melt tension thereby to stabilize bubbles. However, this method sometimes induces decrease of the film strength and decrease of a film transparency.

Accordingly, if olefin polymers (e.g., polypropylene) having a high melt tension are developed, it becomes possible to form large capacity containers such as bottles by a blow molding and to form liners of electrical appliances by a vacuum molding from those polymers, and hence the use applications of the olefin polymers can be much more extended.

Further, when the olefin polymers having a high melt tension are molded into films by means of an inflation molding, the bubbles can be stabilized and the molding speed can be made higher.

For these reasons, an advent of olefin polymers such as polypropylene, high-density polyethylene and linear low-density polyethylene having high melt tension has been eagerly desired.

The present inventors have studied on the olefin polymers of high melt tension to comply with the above-mentioned requirements, and as a result, they have found that an $\alpha$-olefin/polyene copolymer-containing polymer of high melt tension can be obtained by a process of copolymerizing an $\alpha$-olefin and a polyene to a catalyst for olefin polymerization which comprises a transition metal compound catalyst component and an organometallic compound catalyst component, and then polymerizing olefin to the resulting product. The present inventors have further studied earnestly based on this finding, and they have found that an olefin polymer composition comprising an $\alpha$-olefin/polyene copolymer-containing polymer and a conventionally known olefin polymer, said $\alpha$-olefin/polyene copolymer-containing polymer being obtained by copolymerizing an $\alpha$-olefin and a polyene in the presence of a catalyst for olefin polymerization and then polymerizing olefin to the resulting product as mentioned above, shows a high melt tension and a high moldability in the molding procedure such as an inflation molding, and can be molded even by an inflation molding, etc. Thus, the present invention has been accomplished.

OBJECT OF THE INVENTION

The object of the present invention is to provide an olefin polymer composition which shows a high moldability when it is molded into for example a film and has a high melt tension so that it can be molded into a large capacity container by mean of a blow molding, although such molding is hardly applicable conventionally.

SUMMARY OF THE INVENTION

There is provided by the present invention an olefin polymer composition comprising:

[I] an $\alpha$-olefin/polyene copolymer-containing polymer in an amount of 0.005 to 99% by weight, said $\alpha$-olefin/polyene copolymer-containing polymer comprising:
  (i) an $\alpha$-olefin/polyene copolymer, and
  (ii) an olefin polymer; and

[II] an olefin polymer in an amount of 1 to 99.995% by weight wherein the polyene has 7 or more carbon atoms and having an olefinic double bond at both terminals, and the $\alpha$-olefin/polyene copolymer contains constituent units derived from the $\alpha$-olefin in an amount of 99.999 to 70 mol % and contains constituent units derived from the polyene in an amount of 0.001 to 30 mol %, the olefin polymer (ii) is a polymer of olefin having 3 or more carbon atoms, the $\alpha$-olefin/polyene copolymer-containing polymer [I] contains the $\alpha$-olefin/polyene copolymer (i) in an amount of 0.001 to 99% by weight and contains the olefin polymer (ii) in an amount of 99.999 to 1% by weight, and the olefin polymer [II] is a polymer of olefin having 3 or more carbon atoms.

The $\alpha$-olefin/polyene copolymer-containing polymer [I] can be prepared by polymerizing or copolymerizing olefin to a prepolymerized catalyst so as to form the olefin polymer (ii), said prepolymerized catalyst comprising the $\alpha$-olefin/polyene copolymer (i) obtained by copolymerizing an $\alpha$-olefin and a polyene to a catalyst component which comprises:

[A] a transition metal compound catalyst component, and

[B] an organometallic compound catalyst component containing a metal selected from metals in Group I to Group III of the periodic table, in the total amounts of the $\alpha$-olefin and the polyene compound of 0.01 to 2,000 g per 1 g of the transition metal compound catalyst component [A].

Such olefin polymer composition comprising the $\alpha$-olefin/polyene copolymer-containing polymer [I] and the olefin polymer [II] as mentioned above has a high melt tension and a high moldability in the inflation molding procedure and can be molded into a large capacity container or the like by means of a blow molding, etc.

DETAILED DESCRIPTION OF THE INVENTION

Figure 1:
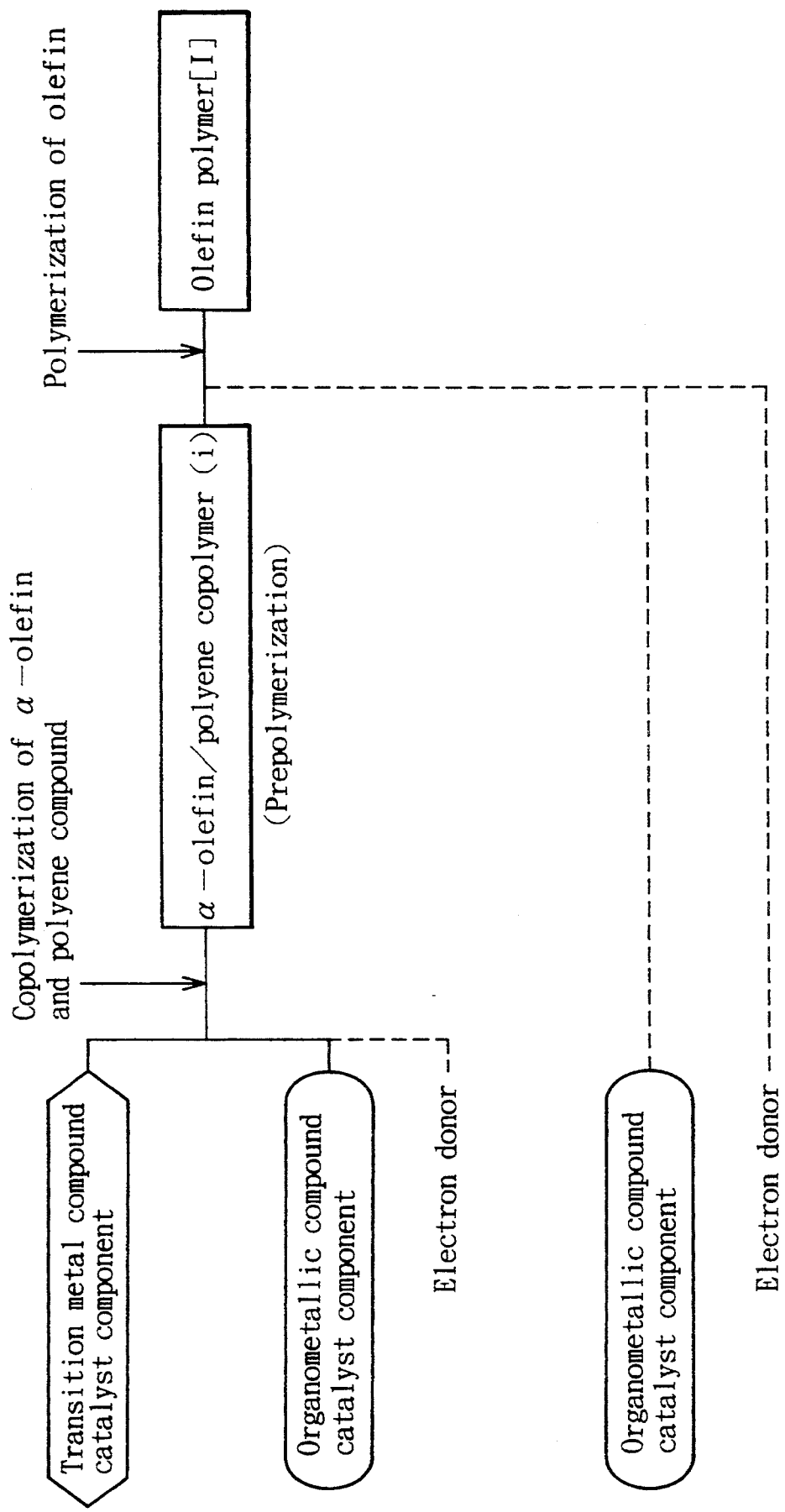
FIG. 1 is a view illustrating steps of a process for preparing an α-olefin/polyene copolymer-containing polymer [I] used in the invention.

The olefin polymer composition according to the present invention is described in detail hereinafter.

The term "polymerization" used in the invention sometimes means not only "homopolymerization" but also "copolymerization", and the term "polymer" used in the invention sometimes means not only "homopolymer" but also "copolymer".

The olefin polymer composition according to the invention comprises:

[I] an α-olefin/polyene copolymer-containing polymer, and

[II] an olefin polymer.

In FIG. 1, the steps of a process for preparing the α-olefin/polyene copolymer-containing polymer [I] used in the invention are illustrated.

At first, the α-olefin/polyene copolymer-containing polymer [I] used in the invention is described.

The α-olefin/polyene copolymer-containing polymer [I] used in the invention comprises:

(i) an α-olefin/polyene copolymer, and (ii) an olefin polymer.

Such α-olefin/polyene copolymer-containing polymer [I] can be obtained by, for example, polymerizing or copolymerizing olefin to a prepolymerized catalyst so as to form an olefin polymer (ii), said prepolymerized catalyst comprising the α-olefin/polyene copolymer (i) which is obtained by copolymerizing an α-olefin and a polyene compound to a catalyst component comprising [A] a transition metal compound catalyst component and [B] an organometallic compound catalyst component.

The α-olefin and the polyene compound used for preparing the α-olefin/polyene copolymer (ii) will be described below.

The α-olefins employable in the invention are α-olefins of 2–20 carbon atoms. Concrete examples of such α-olefins include ethylene, propylene, 1-butene, 1-pentene, 1-hexene, 3-methyl-1-butene, 3-methyl-1-pentene, 4-methyl-1-pentene, 1-octene, 1-decene, 1-dodecene, 1-tetradecene, 1-hexadecene, 1-octadecene and 1-eicosene. They can be used singly or in combination.

The α-olefin used herein may be the same or different from an α-olefin which is used for preparing the olefin polymer (ii) described later.

Among the above-exemplified α-olefins, preferably used are ethylene, propylene, 1-butene, 4-methyl-1-pentene, 3-methyl-1-butene and 1-eicosene.

Concrete examples of the polyene compounds include:

aliphatic polyene compounds such as 4-methyl-1,4-hexadiene, 5-methyl-1,4-hexadiene, 6-methyl-1,6-octadiene, 7-methyl-1,6-octadiene, 6-ethyl-1,6-octadiene, 6-propyl-1,6-octadiene, 6-butyl-1,6-octadiene, 6-methyl-1,6nonadiene, 7-methyl-1,6-nonadiene, 6-ethyl-1,6-nonadiene, 7-ethyl-1,6-nonadiene, 6-methyl-1,6-decadiene, 7-methyl- 1,6-decadiene, 6-methyl-1,6-undecadiene, 1,4-hexadiene, 1,5-hexadiene, 1,6-heptadiene, 1,6-octadiene, 1,7-octadiene, 1,8-nonadiene, 1,9-decadiene, 1,13-tetradecadiene, 1,5,9-decatriene butadiene and isoprene;

vinylcyclohexene, vinylnorbornene, ethylidenenorbornene, dicyclopentadiene, cyclooctadiene, 2,5-norbornadiene;

alicyclic polyene compounds such as 1,4-divinylcyclohexane, 1,3-divinylcyclohexane, 1,3-divinylcyclopentane, 1,5-divinylcyclooctane, 1-allyl-4-vinylcyclohexane, 1,4-diallylcyclohexane, 1-allyl-5-vinylcyclooctane, 1,5-diallylcyclooctane, 1-allyl-4-isopropenylcyclohexane, 1-isopropenyl-4-vinylcyclohexane and 1-isopropenyl-3-vinylcyclopentane; and aromatic polyene compounds such as divinylbenzene and vinylisopropenylbenzene.

They are used singly or in combination.

Among the above-mentioned polyene compounds, preferably used in the invention are polyene compounds having 7 or more carbon atoms and having an olefinic double bond at the both terminals, and more preferably used are aliphatic or alicyclic polyene compounds having an olefinic double bond at the both terminals.

Concrete examples of such preferable polyene compounds include 1,6-heptadiene, 1,7-octadiene, 1,9-decadiene, 1,13-tetradecadiene, 1,5,9-decatriene, 1,4-divinylcyclohexane, 1,3-divinylcyclopentane, 1,5-divinylcyclooctane, 1-allyl-4 -vinylcyclohexane, 1,4-diallylcyclohexane and 1,3,4-trivinylcyclohexane.

Of these, preferred are aliphatic polyene compounds having 8 or more carbon atoms, preferably 10 or more carbon atoms, and particularly preferred are straight-chain aliphatic polyene compounds having 10 or more carbon atoms.

In the preparation of the α-olefin/polyene copolymer (i), the α-olefin and the polyene compound are preferably copolymerized in the following combinations:

ethylene/1,7-octadiene, ethylene/1,9-decadiene, ethylene/1,13-tetradecadiene, ethylene/1,5,9-decatriene, propylene/1,7-octadiene, propylene/1,9-decadiene, propylene/1,13-tetradecadiene, propylene/1,5,9-decatriene, butene/1,9-decadiene, butene/1,5,9-decatriene, 4-methyl-1-pentene/1,9-decadiene, 3-methyl-1-butene/1,9-decadiene, 1-eicosene/1,9-decadiene, propylene/1,4-divinylcyclohexane, and butene/1,4-divinylcyclohexane.

The α-olefin/polyene copolymer (i) is desired to contain constituent units derived from the α-olefin in an amount of generally 99.999 to 50% by mol, preferably 99.999 to 70% by mol, more preferably 99.995 to 75% by mol, much more preferably 99.99 to 80% by mol, most preferably 99.95 to 85% by mol, and to contain constituent units derived from the polyene compound in an amount of generally 0.001 to 50% by mol, preferably 0.001 to 30% by mol, more preferably 0.005 to 25% by mol, much more preferably 0.01 to 20% by mol, most preferably 0.05 to 15% by mol.

In the present invention, the α-olefin/polyene copolymer (i) is preferably a high-molecular-weight copolymer. The melt flow rate of the α-olefin/polyene copolymer (i) is preferably 0.1 dg/min or less, more preferably 0.01 dg/min or less.

Further, the α-olefin/polyene copolymer (i) may also contain constituent units derived from other olefins described later in such an amount that the objects of the invention are not marred. In this case, the constituent units derived from other olefins are contained in the α-olefin/polyene copolymer (i) in an amount of generally less than 30% by mol, preferably not more than 20% by mol, more preferably not more than 15% by mol.

The composition ratio in the above-mentioned α-olefin/polyene copolymer can be determined by measuring the amounts of the α-olefin and the polyene compound consumed in the prepolymerization reaction. Concretely, the constituent units [P] (% by mol) can be calculated as follows.

$$[P] \text{ (\% by mol)} = \frac{([P_0] - [P_r]) \times 100}{([P_0] - [P_r]) + ([\alpha_0] - [\alpha_r])}$$

In the above formula, each symbols have the following meanings.

[$P_0$]: number of moles of the polyene compound fed in the prepolymerization

[$P_r$]: number of moles of the unreacted polyene compound

[$\alpha_0$]: number of moles of the α-olefin fed in the prepolymerization

[$\alpha_r$]: number of the unreacted α-olefin

[$\alpha_r$] and [$P_r$] in the above formula can be determined by measuring the unreacted α-olefin and the unreacted polyene compound both remaining in the polymerizer by means of gas chromatography, etc.

Examples of the olefins used for preparing the olefin polymer (ii) for forming the α-olefin/polyene copolymer-containing polymer [I] are the aforementioned α-olefins of 2 to 20 carbon atoms, preferably 3 or more carbon atoms.

Also employable are:
aromatic vinyl compounds such as styrene, substituted styrenes (e.g., dimethyl styrene), allylbenzene, substituted allylbenzenes (e.g., allyltoluene), vinylnaphthalene, substituted vinylnaphthalenes, allylnaphthalene and substituted allylnaphthalenes;

alicyclic vinyl compounds such as vinylcyclohexane, substituted vinylcyclohexanes, vinylcyclopentane, substituted vinylcyclopentanes, vinylcycloheptane, substituted vinylcycloheptanes and allylnorbornane;

cyclic olefins such as cyclopentene, cycloheptene, norbornene, 5-methyl-2-norbornene, tetracyclododecene and 2-methyl-1,4,5,8-dimethano-1,2,3,4,4a,5,8,8a-octahydronaphthalene;

silane type unsaturated compounds such as allyltrimethylsilane, allyltriethylsilane, 4-trimethylsilyl-1-butene, 6-trimethylsilyl-1-hexene, 8-trimethylsilyl-1-octene and 10-trimethylsilyl-1-decene; and the aforementioned polyene compounds.

They can be employed singly or in combination.

Of these, preferably used are propylene, 1-butene, 3-methyl-1-butene, 3-methyl-1-pentene, 4-methyl-1-pentene, vinylcyclohexane, dimethyl styrene, allyltrimethylsilane and allylnaphthalene.

The α-olefin/polyene copolymer-containing polymer [I] contains the α-olefin/polymer copolymer (i) in an amount of 0.001 to 99% by weight, preferably 0.005 to 90% by weight, more preferably 0.01 to 88% by weight, and contains the olefin polymer (ii) in an amount of 99.999 to 1% by weight, preferably 99.995 to 10% by weight, more preferably 99.99 to 12% by weight.

Among such olefin polymers according to the invention, particularly preferred is an olefin polymer containing the α-olefin/polyene copolymer (i) in an amount of 0.001 to 15% by weight, especially 0.008 to 10% by weight and the olefin polymer (ii) in an amount of 99.999 to 85% by weight, especially 99.992 to 90% by weight.

The melt flow rate (MFR) of the olefin polymer according to the invention, as measured in accordance with ASTM D1238 (polypropylene:230° C., polyethylene:190° C.), is not more than 5000 g/10 min, preferably in the range of 0.01 to 3000 g/10 min, more preferably 0.02 to 2000 g/10 min, most preferably 0.05 to 1000 g/10 min.

Such α-olefin/polyene copolymer-containing polymer [I] has a high melt tension (MT).

In the α-olefin/polyene copolymer-containing polymer [I] used in the invention, the melt tension (MT) and the melt flow rate (MFR) satisfy the following relation.

For example, if the α-olefin/polyene copolymer (i) and the olefin polymer (ii) both constituting the α-olefin/polyene copolymer-containing polymer [I] are an ethylene/polyene copolymer and propylene homopolymer, respectively, the melt tension and the melt flow rate in this α-olefin/polyene copolymer-containing polymer [I] satisfy the following relation:

generally, log[MT] ≧ −0.8 log[MFR]+0.3;
preferably, log[MT] ≧ −0.8 log[MFR]+0.5;
more preferably, log [MT] ≧ −0.8 log[MFR]+0.7;
most preferably, log [MT] ≧ −0.8 log[MFR]+0.8.

Further when the olefin polymer (ii) is propylene random polymer the melt tension and the melt flow rate in this α-olefin/polyene copolymer-containing polymer [I] satisfy the above-mentioned relation.

If the α-olefin/polyene copolymer (i) is a copolymer of α-olefin having 3 or more carbon atoms and polyene and the olefin polymer (ii) is polypropylene in the α-olefin/polyene copolymer-containing polymer [I], the melt tension and the melt flow rate in this α-olefin/polyene copolymer-containing polymer [I] satisfy the following relation:

generally, log[MT] ≧ −0.8 log [MFR]+0.30;
preferably, log[MT] ≧ −0.8 log[MFR]+0.35;
more preferably, log[MT] ≧ −0.8 log[MFR]+0.40.

By the way when a melt tension of the olefin polymer (ii) is represented as [$MT_0$], a melt tension of the α-olefin/polyene copolymer-containing polymer is represented as [MT] and a weight percentage of the α-olefin/polyene copolymer (i) in the α-olefin/polyene copolymer-containing polymer is represented as [C], these [$MT_0$], [MT] and [C] satisfy the following relation:

$$\frac{[MT]}{[MT_0]} \geq \frac{1}{20} \log[C] + 1.25$$

preferably $$\frac{[MT]}{[MT_0]} \geq \frac{1}{10} \log[C] + 1.50$$

more preferably $$\frac{[MT]}{[MT_0]} \geq \frac{3}{20} \log[C] + 1.75$$

most preferably $$\frac{[MT]}{[MT_0]} \geq \frac{1}{5} \log[C] + 2.00$$

Furthermore, when the α-olefin/polyene copolymer-containing polymer [I] is composed of the ethylene/polyene copolymer (i) and polyethylene (ii) as described above and has a density of about 0.92 g/cm³ and MFR of 1 g/10 min, the melt tension of this α-olefin/polyene copolymer-containing polymer is not less than 2.5 g, preferably not less than 3.5 g, more preferably not less than 4.0 g, much more preferably not less than 4.5 g, most preferably not less than 5.0 g.

An intrinsic viscosity [η] of the olefin polymer according to the invention, as measured in decalin at 135° C., is in the range of 0.05 to 20 dl/g, preferably 0.1 to 15 dl/g, more preferably 0.2 to 13 dl/g.

In the olefin polymer of the invention, the melt tension (MT) and an intrinsic viscosity [η] also satisfy the following relation.

For example, if the α-olefin/polyene copolymer (i) and the olefin polymer (ii) both constituting the olefin polymer of the invention are an ethylene/polyene copolymer and polypropylene, respectively, the melt tension and the intrinsic viscosity [η] in this olefin polymer satisfy the following relation:

generally, $\log[MT] \geq 3.7 \log[(\eta)] - 1.5$;
preferably, $\log[MT] \geq 3.7 \log[(\eta)] - 1.3$;
more preferably, $\log[MT] \geq 3.7 \log[(\eta)] - 1.1$;
most preferably, $\log[MT] \geq 3.7 \log[(\eta)] - 1.0$.

If the α-olefin/polyene copolymer (i) is a copolymer of α-olefin of 3 or more carbon atoms and polyene and the olefin polymer (ii) is polypropylene in the olefin polymer of the invention, the melt tension and the intrinsic viscosity in this olefin polymer satisfy the following relation:

generally, $\log[MT] \geq 3.7 \log[(\eta)] - 1.50$;
preferably, $\log[MT] \geq 3.7 \log[(\eta)] - 1.45$;
more preferably, $\log[MT] \geq 3.7 \log[(\eta)] - 1.40$.

Furthermore, when the olefin polymer of the invention is composed of an ethylene/polyene copolymer (i) and polyethylene (ii) as described above and has a density of about 0.92 g/cm³ and the intrinsic viscosity [η] of 1.8 dl/g, the melt tension of this olefin polymer is not less than 2.5 g, preferably not less than 3.5 g, more preferably not less than 4.0 g, much more preferably not less than 4.5 g, most preferably not less than 5.0 g.

The melt tension can be determined in the following manner.

Using a MT measuring machine (produced by Toyo Seiki Seisakusho K.K.), 7 g of a polymer is introduced into a cylinder having an orifice on the bottom and a piston, the cylinder being kept at a melting temperature of the polymer (polypropylene: 230 ° C.). After 5 minutes, the piston is pushed down at a rate of 10 mm/min to extrude a molten polymer in the form of strand from the cylinder through the orifice provided on the bottom of the cylinder. The extruded strand is drawn in the form of filament, and wound up at a rate of 25 m/min by way of a pulley of a load detector. In this stage, a stress applied to the pulley is measured. The obtained value is a melt tension of the polymer.

Next, the transition metal compound catalyst component [A] used for preparing the above-described α-olefin/polyene copolymer-containing polymer [I] will be described.

The transition metal compound catalyst component [A] used in the invention is a compound containing a transition metal selected from metals in Group III to Group VIII of a periodic table, and preferably is a compound containing at least one transition metal selected from Ti, Zr, Hf, Nb, Ta, Cr and V.

Examples of such transition metal compound catalyst component [A] include a variety of known catalyst components, and concretely are solid titanium catalyst components containing titanium and halogen. In more concrete, one example of the solid titanium catalyst components is a solid titanium catalyst component [A-1] containing titanium, magnesium and halogen, and further containing an electron donor (a) if necessary.

Processes for preparing the solid titanium catalyst component [A-1] are described in detail in the following publications.

That is, the processes are described, for example, in Japanese Patent Publications No. 46(1971)-34092, No. 53(1978)-46799, No. 60(1985)-3323 and No. 63(1988)-54289, Japanese Patent Laid-open Publications No. 1(1989)-261404 and No. 1(1989)-261407, Japanese Patent Publications No. 47(1972)-41676, No. 47(1972)-46269 and No. 48(1973)-19794, Japanese Patent Laid-open Publications No. 60(1985)-262803, No. 59(1984)-147004, No. 59(1984)-149911, No. 1(1989)-201308, No. 61(1986)-151211, No. 53(1978)-58495, No. 53(1978)-87990, No. 59(1984)-206413, No. 58(1983)-206613, No. 58(1983)-125706, No. 63(1988)-68606, No. 63(1988)-69806, No. 60(1985)-81210, No. 61(1986)-40306, No. 51(1976)-281189, No. 50(1975)-126590 and No. 51(1976)-92885, Japanese Patent Publications No. 57(1982)-45244, No. 57(1982)-26613 and No. 61(1986)-5483, Japanese Patent Laid-open Publication No. 56(1981)-811, Japanese Patent Publications No. 60(1985)-37804 and No. 59(1984)-50246, Japanese Patent Laid-open Publications No. 58(1983)-83006, No. 48(1973)-16986, No. 49(1974)-65999 and No. 49(1974)-86482, Japanese Patent Publications No. 56(1981)-39767 and No. 56(1981)-32322, and Japanese Patent Laid-open Publications No. 55(1980)-29591, No. 53(1978)-146292, No. 57(1982)-63310, No. 57(1982)-63311, No. 57(1982)-63312, No. 62(1987)-273206, No. 63(1988)-69804, No. 61(1986)-21109, No. 63(1988)-264607, No. 60(1985)-23404, No. 60(1985)-44507, No. 60(1985)-158204, No. 61(1986)-55104, No. 2(1990)-28201, No. 58(1983)-196210, No. 64(1989)-54005, No. 59(1984)-149905, No. 61(1986)-145206, No. 63(1988)-302, No. 63(1988)-225605, No. 64(1989)-69610, No. 1(1989)-168707, No. 62(1987)-104810, No. 62(1987)-104811, No. 62(1987)-104812 and No. 62(1987)-104813.

The solid titanium catalyst component [A-1] can be prepared by using for example a titanium compound, a magnesium compound and if desired an electron donor (a), and bringing them into contact with each other.

Examples of the titanium compounds employable for preparing the solid titanium catalyst component [A-1] include tetravalent titanium compounds and trivalent titanium compounds.

As the tetravalent titanium compounds, there can be mentioned compounds represented by the following formula:

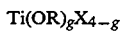

wherein R is a hydrocarbon group, X is a halogen atom, and g is a number satisfying the condition of $0 \leq g \leq 4$.

Concrete examples of such compounds are described below.

Titanium tetrahalides such as $TiCl_4$, $TiBr_4$ and $TiI_4$
Alkoxytitanium trihalides such as:
$Ti(OCH_3)Cl_3$,
$Ti(OC_2H_5)Cl_3$,
$Ti(On-C_4H_9)Cl_3$,
$TI(OC_2H_5)Br_3$, and
$TI(O-iso-C_4H_9)Br_3$
Dialkoxytitanium dihalides such as:
$Ti(OCH_3)_2Cl_2$,
$Ti(OC_2H_5)_2Cl_2$,
$Ti(On-C_4H_9)_2Cl_2$, and
$Ti(OC_2H_5)_2Br_2$
Trialkoxytitanium monohalides such as
$Ti(OCH_3)_3Cl$,
$Ti(OC_2H_5)_3Cl$,
$Ti(On-C_4H_9)_3Cl$, and
$Ti(OC_2H_5)_3Br$
Tetraalkoxytitaniums such as:
$Ti(OCH_3)_4$,
$Ti(OC_2H_5)_4$,
$Ti(On-C_4H_9)_4$,
$Ti(O-iso-C_4H_9)_4$, and
$Ti(O-2-ethylhexyl)_4$ Of these, preferred are titanium tetrahalides, and particularly preferred is titanium tetrachloride. These titanium compounds may be used singly or in combination. Further, they can be used after diluting them in hydrocarbons or halogenated hydrocarbons.

As the trivalent titanium compound, titanium trichloride is employed.

Preferably used titanium trichloride is that obtained by bringing titanium tetrachloride into contact with hydrogen, a metal (e.g., magnesium metal, aluminum metal and titanium metal) or an organometallic compound (e.g., organomagnesium compound, organoaluminum compound and organozinc compound) so as to be reduced.

The magnesium compounds employable for preparing the solid titanium catalyst component [A-1] may or may not have reducing ability.

An example of the magnesium compounds having reducing ability is a compound represented by the following formula:

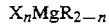
$X_nMgR_{2-n}$ wherein n is a number satisfying the condition of $0 \leq n < 2$; R is hydrogen, an alkyl group of 1-20 carbon atoms, an aryl group or a cycloalkyl group; when n is 0, two of R may be the same or different from each other; and X is halogen.

Concrete examples of the organomagnesium compounds having reducing ability include:
dialkylmagnesium compounds such as dimethylmagnesium, diethylmagnesium, dipropylmagnesium, dibutylmagnesium, diamylmagnesium, dihexylmagnesium, didecylmagneisum, octylbutylmagnesium and ethylbutylmagnesium;
alkylmagnesium halides such as ethylmagnesium chloride, propylmagnesium chloride, butylmagnesium chloride, hexylmagnesium chloride and amylmagnesium chloride;
alkylmagnesium alkoxides such as butylethoxymagnesium, ethylbutoxymagnesium and octylbutoxymagnesium; and
butylmagnesium hydride.

Concrete examples of the magnesium compounds not having reducing ability include:
magnesium halides such as magnesium chloride, magnesium bromide, magnesium iodide and magnesium fluoride;
alkoxymagnesium halides such as methoxymagnesium chloride, ethoxymagnesium chloride, isopropoxymagnesium chloride, butoxymagnesium chloride and octoxymagnesium chloride;
aryloxymagnesium halides such as phenoxymagnesium chloride and methylphenoxymagnesium chloride;
alkoxymagnesiums such as ethoxymagnesium, isopropoxymagnesium, butoxymagnesium, n-octoxymagnesium and 2-ethylhexoxymagnesium;
aryloxymagnesiums such as phenoxymagnesium and dimethylphenoxymagnesium; and
carboxylic acid salts of magnesium such as magnesium laurate and magnesium stearate.

Also employable as the magnesium compound not having reducing ability are other magnesium metals and hydrogenated magnesium.

The above-mentioned magnesium compounds not having reducing ability may be compounds derived from the aforementioned magnesium compounds having reducing ability or compounds derived during the preparation of the catalyst components. In order to derive the magnesium compounds not having reducing ability from the magnesium compounds having reducing ability, for example, the magnesium compounds having reducing ability are brought into contact with polysiloxane compounds, halogen-containing silane compounds, halogen-containing aluminum compounds, esters, alcohols, halogen-containing compounds or compounds having an OH group or an active carbon-oxygen bond.

The above-mentioned magnesium compounds having or not having reducing ability may form the later-described organometallic compounds such as complex compounds with other metals (e.g., aluminum, zinc, boron, beryllium, sodium and potassium) and complex compounds therewith, or may be in the form of a mixture with other metal compound. Further, the magnesium compounds may be used singly or in combination of two or more kinds of the above-mentioned compounds. Moreover, the magnesium compounds may be used either in the liquid form or in the solid form. When the used magnesium compound is solid, the compound can be changed to liquid state using alcohols, carboxylic acids, aldehydes, amines, metallic acid esters, etc. which are described later as electron donors (a).

Other various magnesium compounds than the above-mentioned ones can be also employed for preparing the solid titanium catalyst component [A-1], but preferred are those in the form of halogen-containing magnesium compounds in the finally obtained solid titanium catalyst component [A-1]. Accordingly, if a magnesium compound not containing halogen is used, the compound is preferably brought into contact with a halogen-containing compound to be reacted therewith on the way to prepare the solid titanium catalyst component.

Among the above-mentioned various magnesium compounds, preferred are magnesium compounds not having reducing ability, and of these, magnesium chloride, alkoxymagnesium chloride and aryloxymagnesium chloride are particularly preferred.

In the preparation of the solid titanium catalyst component [A-1], it is preferred to use an electron donor (a).

Examples of the electron donors (a) include:

oxygen-containing electron donors such as alcohols, phenols, ketones, aldehydes, carboxylic acids, organic acid halides, esters of organic or inorganic acids, ethers, diethers, acid amides, acid anhydrides and alkoxysilane; and nitrogen-containing electron donors such as ammonias, amines, nitriles, pyridines and isocyanates.

In more concrete, there can be mentioned for example:

alcohols of 1-18 carbon atoms such as methanol, ethanol, propanol, butanol, pentanol, hexanol, 2-ethylhexanol, octanol, dodecanol, octadecyl alcohol, oleyl alcohol, benzyl alcohol, phenylethyl alcohol, cumyl alcohol, isopropyl alcohol and isopropylbenzyl alcohol;

halogen-containing alcohols of 1-18 carbon atoms such as trichloromethanol, trichloroethanol and trichlorohexanol;

phenols of 6-20 carbon atoms which may have a lower alkyl group such as phenol, cresol, xylenol, ethyl phenol, propyl phenol, nonyl phenol, cumyl phenol and naphthol;

ketones of 3-15 carbon atoms such as acetone, methyl ethyl ketone, methyl isobutyl ketone, acetophenone, benzophenone and benzoquinone;

aldehydes of 2-15 carbon atoms such as acetaldehyde, propionaldehyde, octylaldehyde, benzaldehyde, tolualdehyde and naphthaldedehyde;

organic acid esters of 2-18 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, γ-butyrolactone, δ-valerolactone, cumarine, phthalide and ethyl carbonate;

acid halides of 2-15 carbon atoms such as acetyl chloride, benzoyl chloride, toluic acid chloride and anisic acid chloride;

ethers of 2-20 carbon atoms such as methyl ether, ethyl ether, isopropyl ether, butyl ether, amyl ether, tetrahydrofuran, anisole and diphenyl ether;

acid amides such as N,N-dimethylacetamide, N,N-dimethylbenzamide and N,N-dimethyltoluamide;

amines such as trimethylamine, triethylamine, tributylamine, tribenzylamine and tetramethylethylenediamine;

nitriles such as acetonitrile, benzonitrile and trinitrile;

pyridines such as pyridine, methyl pyridine, ethyl pyridine and dimethyl pyridine; and acid anhydrides such as acetic anhydride, phthalic anhydride and benzoic anhydride.

Preferred examples of the organic acid esters are polycarboxylates having skeleton of the following formula.

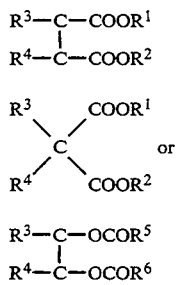

In the above formulas, $R^1$ is a substituted or unsubstituted hydrocarbon group; each of $R^2$, $R^5$ and $R^6$ is hydrogen or a substituted or unsubstituted hydrocarbon group; and each of $R^3$ and $R^4$ is hydrogen or a substituted or unsubstituted hydrocarbon group, preferably at least one of them being a substituted or unsubstituted hydrocarbon group. $R^3$ and $R^4$ may be bonded to each other to form a cyclic structure. When the hydrocarbon groups $R^1$ to $R^6$ are substituted, the substituted groups contain different atoms such as N, O and S, and have groups such as C—O—C, COOR, COOH, OH, $SO_3H$, —C—N—C— and $NH_2$.

Concrete examples of the polycarboxylates include:
aliphatic polycarboxylates,
alicyclic polycarboxylates,
aromatic polycarboxylates, and
heterocyclic polycarboxylates.

Preferred examples of the polycarboxylates are n-butyl maleate, diisobutyl methylmaleate, di-n-hexyl cyclohexenecarboxylate, diethyl nadiate, diisopropyl tetrahydrophthalate, diethyl phthalate, diisobutyl phthalate, di-n-butyl phthalate, di-2-ethylhexyl phthalate and dibutyl 3,4-furandicarboxylate.

Particularly preferred examples of the polycarboxylates are phthalates.

As the diether compounds, there can be mentioned compounds represented by the following formula:

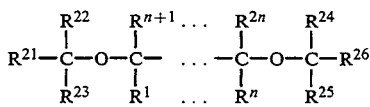

wherein n is an integer satisfying the condition of $2 \leq n \leq 10$; $R^1$ to $R^{26}$ are substituent groups having at least one element selected from carbon, hydrogen, oxygen, halogen, nitrogen, sulfur, phosphorus, boron and silicon; any optional combination of from $R^1$ to $R^{26}$, preferably $R^1$ to $R^{2n}$, may form in corporation a ring other than a benzene ring; and an atom other than a carbon atom may be contained in the main chain.

Preferred examples thereof are:
2,2-diisobutyl-1,3-dimethoxypropane,
2-isopropyl-2-isopentyl-1,3-dimethoxypropane,
2,2-dicyclohexyl-1,3-dimethoxypropane, and
2,2-bis(cyclohexylmethyl)-1,3-dimethoxypropane.

The above-mentioned electron donors may be used in combination of two or more kinds.

In the preparation of the solid titanium catalyst component [A-1] employable in the invention, the above-mentioned various compounds may be brought into contact with organic or inorganic compounds containing silicon, phosphorus, aluminum, etc. which are conventionally used as carrier compounds and reaction assistants.

Useful carrier compounds are $Al_2O_3$, $SiO_2$, $B_2O_3$, MgO, CaO, $TiO_2$, ZnO, $SnO_2$, BaO, ThO and a resin such as a styrene/divinylbenzene copolymer. Of these, preferred are $Al_2O_3$, $SiO_2$ and a styrene/divinylbenzene copolymer.

The solid titanium catalyst component [A-1] employable in the invention is prepared by bringing the aforementioned titanium compound and magnesium compound (and preferably further the above-mentioned electron donor (a)) into contact with each other.

There is no specific limitation on a process for preparing the solid titanium catalyst component [A-1] using those compounds. Examples of the processes using a tetravalent titanium compound are briefly described below.

(1) A process comprising bringing a solution consisting of a magnesium compound, an electron donor (a) and a hydrocarbon solvent into contact with an organometallic compound, after or simultaneously with precipitating a solid by bringing the solution into contact with a titanium compound.

(2) A process comprising bringing a complex composed of a magnesium compound and an electron donor (a) into contact with an organometallic compound, and then bringing the reaction product into contact with a titanium compound.

(3) A process comprising bringing a product obtained by the contact of an inorganic carrier and an organic magnesium compound into contact with a titanium compound. In this case, the above product may be beforehand brought into contact with a halogen-containing compound, an electron donor (a) and/or an organometallic compound.

(4) A process comprising obtaining an inorganic or organic carrier on which a magnesium compound is supported from a mixture of an inorganic or organic carrier and a solution containing a magnesium compound and an electron donor (a) (and further a hydrogen solvent in some cases), and then bringing the obtained carrier into contact with a titanium compound.

(5) A process comprising bringing a solution containing a magnesium compound, a titanium compound and an electron donor (a) (and further a hydrogen solvent in some cases) into contact with an inorganic or organic carrier to obtain a solid titanium catalyst component [A-1] on which magnesium and titanium are supported.

(6) A process comprising bringing a liquid organic magnesium compound into contact with a halogen-containing titanium compound.

(7) A process comprising bringing a liquid organic magnesium compound into contact with a halogen-containing compound, and then bringing the product thus obtained into contact with a titanium compound.

(8) A process comprising bringing an alkoxy group-containing magnesium compound into contact with a halogen-containing titanium compound.

(9) A process comprising bringing a complex composed of an alkoxy group-containing magnesium compound and an electron donor (a) into contact with a titanium compound.

(10) A process comprising bringing a complex composed of an alkoxy group-containing magnesium compound and an electron donor (a) into contact with an organometallic compound, and then bringing the product thus obtained into contact with a titanium compound.

(11) A process comprising bringing a magnesium compound, an electron donor (a) and a titanium compound into contact with each other in an optional order. In this reaction, each components may be pretreated with an electron donor (a) and/or a reaction assistant such as an organometallic compound or a halogen-containing silicon compound.

(12) A process comprising bringing a liquid magnesium compound not having reducing ability into contact with a liquid titanium compound, if necessary in the presence of an electron donor (a), to precipitate a solid magnesium/titanium complex compound.

(13) A process comprising further bringing the reaction product obtained in the above process (12) into contact with an titanium compound.

(14) A process comprising further bringing the reaction product obtained in the above process (11) or (12) into contact with an electron donor (a) and a titanium compound.

(15) A process comprising pulverizing a magnesium compound and a titanium compound (and if necessary an electron donor (a)) to obtain a solid product, and treating the solid product with either halogen, a halogen compound or aromatic hydrocarbon. This process may include a step of pulverizing only a magnesium compound, a step of pulverizing a complex compound composed of a magnesium compound and an electron donor (a), or a step of pulverizing a magnesium compound and a titanium compound. Further, after the pulverization, the solid product may be subjected to a pretreatment with a reaction assistant and then subjected to a treatment with halogen or the like. Examples of the reaction assistants include an organometallic compound and a halogen-containing silicon compound.

(16) A process comprising pulverizing a magnesium compound, and then bringing the pulverized magnesium compound into contact with a titanium compound. In this case, an electron donor (a) or a reaction assistant may be used in the pulverization stage and/or the contacting stage.

(17) A process comprising treating the compound obtained in any of the above processes (11) to (16) with halogen, a halogen compound or aromatic hydrocarbon.

(18) A process comprising bringing the reaction product obtained by the contact of a metal oxide, an organic magnesium compound and a halogen-containing compound into contact with a titanium compound and if necessary an electron donor (a).

(19) A process comprising bringing a magnesium compound such as a magnesium salt of organic acid, alkoxymagnesium or aryloxymagnesium into contact with a titanium compound and/or halogen-containing hydrocarbon and if necessary an electron donor (a).

(20) A process comprising bringing a hydrocarbon solution containing at least a magnesium compound and alkoxytitanium into contact with a titanium compound and/or an electron donor (a). In this case, a halogen-containing compound such as a halogen-containing silicon compound may be further brought into contact therewith, if necessary.

(21) A process comprising bringing a liquid magnesium compound not having reducing ability into contact with an organometallic compound so as to precipitate a solid magnesium/metal (aluminum) complex compound, and then bringing the solid double compound into contact with a titanium compound and if necessary an electron donor (a).

Preparation of the solid titanium catalyst component [A-1] is generally carried out at a temperature of −70° to 200° C., preferably −50° to 150° C.

The solid titanium catalyst component [A-1] thus obtained contains titanium, magnesium and halogen, and preferably further contains an electron donor (a) in addition thereto.

In the solid titanium catalyst component [A-1], a ratio of halogen/titanium (atomic ratio) is 2–200, preferably 4–90, and a ratio of magnesium/titanium (atomic ratio) is 1–100, preferably 2–50.

The electron donor (a) is contained generally in the electron donor (a)/titanium ratio (molar ratio) of 0.01 to 100, preferably 0.05 to 50.

As for the solid titanium catalyst component [A-1], examples using a titanium compound are described in the invention, but the titanium used in the above compounds can be replaced with zirconium, hafnium, vanadium, niobium, tantalum or chromium.

In the invention, a titanium trichloride catalyst component [A-2] which is conventionally known can be also employed as other example of the solid titanium catalyst component exemplified as the transition metal compound catalyst component [A].

Processes for preparing the titanium trichloride catalyst component [A-2] are described in detail, for example, in Japanese Patent Laid-open Publications No. 63(1988)-17274, No. 64(1989)-38409, No. 56(1981)-34711, No. 61(1986)-287904, No. 63(1988)-75007, No. 63(1988)-83106, No. 59(1984)-13630, No. 63(1988)-108008, No. 63(1988)-27508, No. 57(1982)-70110, No. 58(1983)-219207, No. 1(1989)-144405 and No. 1(1989)-292011.

An example of the titanium trichloride catalyst component [A-2] is the aforementioned titanium trichloride. The titanium trichloride can be used together with the aforementioned electron donor (a) and/or tetravalent titanium compound, or can be used after those components are brought into contact with each other.

Further, a metallocene compound [A-3] can be also employed as the transition metal compound catalyst component [A].

Processes for preparing the metallocene compound [A-3] are described in detail, for example, in Japanese Patent Laid-open Publications No. 63(1988)-61010, No. 63(1988)-152608, No. 63(1988)-264606, No. 63(1988)-280703, No. 64(1989)-6003, No. 1(1989)-95110, No. 3(1991)-62806, No. 1(1989)-259004, No. 64(1989)-45406, No. 60(1985)-106808, No. 60(1985)-137911, No. 58(1983)-19309, No. 60(1985)-35006, No. 60(1985)-35007, No. 61(1986)-296008, No. 63(1988)-501369, No. 61(1986)-221207, No. 62(1987)-121707, No. 61(1986)-66206, No. 2(1990)-22307, No. 2(1990)-173110, No. 2(1990)-302410, No. 1(1989)-129003, No. 1(1989)-210404, No. 3(1991)-66710, No. 3(1991)-70710, No. 1(1989)-207248, No. 63(1988)-222177, No. 63(1988)-222178, No. 63(1988)-222179, No. 1(1989)-12407, No. 1(1989)-301704, No. 1(1989)-319489, No. 3(1991)-74412, No. 61(1986)-264010, No. 1(1989)-275609, No. 63(1988)-251405, No. 64(1989)-74202, No. 2(1990)-41303, No. 2(1990)-131488, No. 3(1991)-56508, No. 3(1991)-70708 and No. 3(1991)-70709.

The metallocene compound [A-3] is a compound concretely represented by the formula $$ML_x$$

wherein M is a transition metal selected from the group consisting of Zr, Ti, Hf, V, Nb, Ta and Cr, L is a ligand coordinating to the transition metal, at least one of L is a ligand having a cyclopentadienyl skeleton, L other than the ligand having a cyclopentadienyl skeleton is a hydrocarbon group of 1-12 carbon atoms, an alkoxy group, an aryloxy group, trialkylsilyl group, $SO_3R$ (wherein R is a hydrocarbon group of 1 to 8 carbon atoms which may have a substituent such as halogen), halogen atom or hydrogen atom, and x is a valence of the transition metal.

The ligands having a cyclopentadienyl skeleton include, for example, cyclopentadienyl, alkyl-substituted cyclopentadienyl groups such as methylcyclopentadienyl, dimethylcyclopentadienyl, trimethylcyclopentadienyl, tetramethylcyclopentadienyl, pentamethylcyclopentadienyl, ethylcyclopentadienyl, methylethylcyclopentadienyl, propylcyclopentadienyl, methylpropylcyclopentadienyl, butylcyclopentadienyl, methylbutylcyclopentadienyl, and hexylcyclopentadienyl, and an indenyl group, 4,5,6,7-tetrahydroindenyl group and a fluorenyl group. These groups may be substituted by a halogen atom or trialkylsilyl group.

Of these ligands coordinating to the transition metal, the alkyl-substituted cyclopentadienyl groups are most preferred.

When the compound represented by the above formula contains two or more ligands having a cyclopentadienyl skeleton, two ligands having a cyclopentadienyl skeleton may be bonded together via an alkylene group such as ethylene and propylene, a substituted alkylene group such as isopropylidene and diphenylmethylene, a silylene group or a substituted silylene group such as dimethylsilylene, diphenylsilylene and methylphenylsilylene.

Following ligands may be exemplified as the ligand other than those having a cyclopentadienyl skeleton.

The hydrocarbon group having 1–12 carbon atoms includes, for example, alkyl, cycloalkyl, aryl and aralkyl;

the alkyl group includes methyl, ethyl, propyl, isopropyl and butyl;

the cycloalkyl group includes, for example, cyclopentyl and cyclohexyl;

the aryl group includes, for example, phenyl and tolyl; and the aralkyl group includes, for example, benzyl and neophyl.

The alkoxy group includes, for example, methoxy, ethoxy and butoxy;

the aryloxy group includes, for example, phenoxy; and the hologen includes, for example, fluorine, chlorine, bromine and iodine.

The ligand represented by $SO_3R$ includes, for example, p-toluenesulfonate, methanesulfonate and trifluoromethanesulfonate.

When the transition metal has a valence of 4, the metallocene compound [A-3] containing ligands having a cyclopentadienyl skeleton may be represented more concretely by the formula $$R^2_k R^3_l R^4_m R^5_n M$$

wherein M is an above mentioned transition metal, $R^2$ is a group (ligand) having a cyclopentadienyl skeleton, $R^3$, $R^4$ and $R^5$ are each a group having a cyclopentadienyl skeleton, an alkyl group, cycloalkyl group, aryl group, aralkyl group, alkoxy group, aryloxy group, trialkylsilyl group, $SO_3R$ group, halogen atom or hydrogen atom, k is an integer of at least 1, and $k+l+m+n=4$.

In the transition metal compounds of the above-mentioned formula $R^2{}_kR^3{}_lR^4{}_mR^5{}_nM$, at least two of $R^2$, $R^3$, $R^4$ and $R^5$ preferably have a cyclopentadienyl skeleton, that is, $R^2$ and $R^3$ are each a group having a cyclopentadienyl skeleton. These groups having a cyclopentadienyl skeleton may be bonded to each other via an alkylene group such as ethylene and propylene, a substituted alkylene group such as isopropylidene, diphenylmethylene, a silylene group or a substituted silylene group such as dimethylsilylene, diphenylsilylene and methylphenylsilylene. Also, $R^4$ and $R^5$ may be each a group having a cyclopentadienyl skeleton, an alkyl group, cycloalkyl group, aryl group, aralkyl group, alkoxy group, aryloxy group, trialkylsilyl group, $SO_3R$, halogen atom or hydrogen atom.

Listed below are typical representatives of the transition metal compounds in which M is zirconium.

Bis(indenyl)zirconium dichloride,
Bis(indenyl)zirconium dibromide,
Bis(indenyl)zirconium bis(p-toluenesulfonate),
Bis(4,5,6,7-tetrahydroindenyl)zirconium dichloride,
Bis(fluorenyl)zirconium dichloride,
Ethylenebis(indenyl)zirconium dichloride,
Ethylenebis(indenyl)zirconium dibromide,
Ethylenebis(indenyl)dimethyl zirconium,
Ethylenebis(indenyl)diphenyl zirconium,
Ethylenebis(indenyl)methyl zirconium monochloride,
Ethylenebis(indenyl)zirconium bis(methanesulfonate),
Ethylenebis(indenyl)zirconium bis(p-toluenesulfonate),
Ethylenebis(indenyl)zirconium bis(trifluoromethanesulfonate),
Ethylenebis(4,5,6,7-tetrahydroindenyl)zirconium dichloride,
Isopropylidene(cyclopentadienyl-fluorenyl)zirconium dichloride,
Isopropylidene(cyclopentadienylmethylcyclopentadienyl) zirconium dichloride,
Dimethylsilylenebis(cyclopentadienyl)zirconium dichloride,
Dimethylsilylenebis(methylcyclopentadienyl)zirconium dichloride,
Dimethylsilylenebis(dimethylcyclopentadienyl)zirconium dichloride,
Dimethylsilylenebis(trimethylcyclopentadienyl)zirconium dichloride,
Dimethylsilylenebis(indenyl)zirconium dichloride,
Dimethylsilylenebis(indenyl)zirconium bis(trifluoromethanesulfonate),
Dimethylsilylenebis(4,5,6,7-tetrahydroindenyl)zirconium dichloride,
Dimethylsilylene(cyclopentadienyl-fluorenyl)zirconium dichloride,
Diphenylsilylenebis(indenyl)zirconium dichloride,
Methylphenylsilylenebis(indenyl)zirconium dichloride,
Bis(cyclopentadienyl)zirconium dichloride,
Bis(cyclopentadienyl)zirconium dibromide,
Bis(cyclopentadienyl)methyl zirconium monochloride,
Bis(cyclopentadienyl)ethyl zirconium monochloride,
Bis(cyclopentadienyl)cyclohexyl zirconium monochloride,
Bis(cyclopentadienyl)phenyl zirconium monochloride,
Bis(cyclopentadienyl)benzyl zirconium monochloride,
Bis(cyclopentadienyl)zirconium monochloride monohydride,
Bis(cyclopentadienyl)methyl zirconium monohydride,
Bis(cyclopentadienyl)dimethyl zirconium,
Bis(cyclopentadienyl)diphenyl zirconium,
Bis(cyclopentadienyl)dibenzyl zirconium,
Bis(cyclopentadienyl)zirconium methoxy chloride,
Bis(cyclopentadienyl)zirconium ethoxy chloride,
Bis(cyclopentadienyl)zirconium bis(methanesulfonate),
Bis(cyclopentadienyl)zirconium bis(p-toluenesulfonate),
Bis(cyclopentadienyl)zirconium bis(trifluoromethanesulfonate),
Bis(methylcyclopentadienyl)zirconium dichloride,
Bis(dimethylcyclopentadienyl)zirconium dichloride,
Bis(dimethylcyclopentadienyl)zirconium ethoxy chloride,
Bis(dimethylcyclopentadienyl)zirconium bis(trifluoromethanesulfonate),
Bis(ethylcyclopentadienyl)zirconium dichloride,
Bis(methylethylcyclopentadienyl)zirconium dichloride,
Bis(propylcyclopentadienyl)zirconium dichloride,
Bis(methylpropylcyclopentadienyl)zirconium dichloride,
Bis(butylcyclopentadienyl)zirconium dichloride,
Bis(methylbutylcyclopentadienyl)zirconium dichloride,
Bis(methylbutylcyclopentadienyl)zirconium bis(methanesulfonate),
Bis(trimethylcyclopentadienyl)zirconium dichloride,
Bis(tetramethylcyclopentadienyl)zirconium dichloride,
Bis(pentamethylcyclopentadienyl)zirconium dichloride,
Bis(hexylcyclopentadienyl)zirconium dichloride,
Bis(trimethylsilylcyclopentadienyl)zirconium dichloride In the above-mentioned metallocene compound, the di-substituted cyclopentadienyl groups include 1,2- and 1,3-substituted groups, and the tri-substituted cyclopentadienyl groups include 1,2,3- and 1,2,4- substituted groups. Also the alkyl groups such as propyl and butyl include n-, i-, sec- and tert- isomers.

There may also be used transition metal compounds wherein the zirconium metal in the above-exemplified zirconium compounds is replaced with titanium, hafnium, vanadium, niobium, tantalum or chromium.

These compounds may be used alone or in combination of two or more.

Further, those compounds may be used after diluted in hydrocarbon or halogenated hydrocarbon.

In the invention, a zirconocene compound having zirconium as its central metal atom and having a ligand containing at least two cyclopentadienyl skeletons is preferably used as the metallocene compound [A-3].

Such metallocene compound as mentioned above can be supported on a carrier by bringing it into contact with a particulate carrier compound.

Examples of the carrier compounds employable in the invention include organic carrier compounds such as $SiO_2$, $Al_2O_3$, $B_2O_3$, MgO, $ZrO_2$, CaO, $TiO_2$, ZnO, $SnO_2$, BaO and ThO; and resins such as polyethylene, polypropylene, poly-1-butene, poly-4-methyl-1-pentene and a styrene/divinylbenzene copolymer.

These carrier compounds may be used in combination of two or more kinds.

Among the above-mentioned compounds, preferably used are SiO$_2$, Al$_2$O$_3$ and MgO.

Next, the organometallic compound catalyst component [B] containing a metal selected from metals in Group I to Group III of the periodic table which is used for preparing the α-olefin/polyene copolymer-containing polymer [I] will be described.

As the organometallic compound catalyst component [B], there can be employed for example an organoaluminum compound [B-1], an alkyl complex compound composed of a metal in Group I of the periodic table and aluminum, an organometallic compound of a metal in Group II of a periodic table.

The organoaluminum compound [B-1] is, for example, the organoaluminum compound represented by the formula:

$$R^a{}_n AlX_{3-n}$$

wherein $R^a$ is hydrocarbon of 1–12 carbon atoms, X is halogen or hydrogen, and n is 1–3.

In the above-mentioned formula, $R^a$ is hydrocarbon group of 1–12 carbon atoms, such as, alkyl, cycloalkyl or aryl, including concretely methyl, ethyl, n-propyl, isopropyl, isobutyl, pentyl, hexyl, octyl, cyclopentyl, cyclohexyl, phenyl, tolyl, etc.

The organoaluminum compounds include, in concrete, such compounds as mentioned below.

Trialkylaluminum such as trimethylaluminum, triethylaluminum, triisopropylaluminum, triisobutylaluminum, trioctylaluminum, tri-2-ethylhexylaluminum, etc;

alkenylaluminum such as isoprenylaluminum, etc;

dialkylaluminum halides such as dimethylaluminum chloride, diethylaluminum chloride, diisopropylaluminum chloride, diisobutylaluminum chloride, dimethylaluminum bromide, etc;

alkylaluminum sesquihalides such as methylaluminum sesquichloride, ethylaluminum sesquichloride, isopropylaluminum sesquichloride, butylaluminum sesquichloride, ethylaluminum sesquibromide, etc;

alkylaluminum dihalides such as methylaluminum dichloride, ethylaluminum dichloride, isopropylaluminum dichloride, ethylaluminum dibromide, etc, and alkylaluminum hydride such as diethylaluminum hydride and diisobutylaluminum hydride.

As the organoaluminum compounds [B-1], there may also be used a compound represented by the following formula:

$$R^a{}_n AlY_{3-n}$$

wherein $R^a$ is as defined above, Y is —OR$^b$, —OSiR$^c{}_3$, —OAlR$^d{}_2$, —NR$^e{}_2$, —SiR$^f{}_3$, or —N(R$^g$)AlR$^h{}_2$, n is 1–2 and R$^b$, R$^c$, R$^d$ and R$^h$ are each methyl, ethyl, isopropyl, isobutyl, cyclohexyl, phenyl, etc;

R$^e$ is hydrogen, methyl, ethyl, isopropyl, phenyl, trimethylsilyl, etc; and R$^f$ and R$^g$ are each methyl, ethyl, etc.

The organoaluminum compounds [B-1] include, in concrete, such compounds as mentioned below.

(i) Compounds of the formula R$^a{}_n$Al(OR$^b$)$_{3-n}$ such as dimethylaluminum methoxide, diethylaluminum ethoxide, diisobutylaluminum methoxide, etc;

(ii) Compounds of the formula R$^a{}_n$Al(OSiR$^c{}_3$)$_{3-n}$ such as Et$_2$Al(OSiMe$_3$), (iso-Bu)$_2$Al(OSiMe$_3$), (iso-Bu)$_2$Al(OSiEt$_3$), etc;

(iii) Compounds of the formula R$^a{}_n$Al(OAlR$^d{}_2$)$_{3-n}$ such as Et$_2$AlOAlEt$_2$, (iso-Bu)$_2$AlOAl(iso-Bu)$_2$, etc;

(iv) Compounds of the formula R$^a{}_n$Al(NR$^e{}_2$)$_{3-n}$ such as Me$_2$AlNEt$_2$, Et$_2$AlNHMe, Me$_2$AlNHEt, Et$_2$AlN(Me$_3$Si)$_2$, (iso-Bu)$_2$AlN(Me$_3$Si)$_2$, etc;

(v) Compounds of the formula R$^a{}_n$Al(SiR$^f{}_3$)$_{3-n}$ such as (iso-Bu)$_2$AlSiMe$_3$, etc; and (vi) Compounds of the formula R$^a{}_n$Al[N(R$^g$)-AlR$^h{}_2$]$_{3-n}$ such as Et$_2$AlN(Me)-AlEt$_2$, (iso-Bu)$_2$AlN(Et)Al(iso-Bu)$_2$, etc.

Of the organoaluminum compounds [B-1] as exemplified above, preferred are those of the formula R$^a{}_3$Al, R$^a{}_n$Al(OR$^b$)$_{3-n}$ or R$^a{}_n$Al(OAlR$^d{}_2$)$_{3-n}$.

The alkyl complex compound composed of a metal in Group I of a periodic table and aluminum can be exemplified by a compound represented by the following formula:

$$M^1 AlR^j{}_4$$

wherein M$^1$ is Li, Na or K, and R$^j$ is a hydrocarbon group of 1–15 carbon atoms.

Concrete examples of the alkyl complex compounds include LiAl(C$_2$H$_5$)$_4$ and LiAl(C$_7$H$_{15}$)$_4$.

The organometallic compound of a metal in Group II of a periodic table can be exemplified by a compound represented by the following formula:

$$R_1 R_2 M_2$$

wherein each of R$_1$ and R$_2$ is a hydrocarbon group of 1–15 carbon atoms or a halogen, R$_1$ and R$_2$ may be the same or different from each other but excluding a case where both of them are halogens, and M$_2$ is Mg, Zn or Cd.

Concrete examples thereof include diethylzinc, diethylmagnesium, butylethylmagnesium, ethylmagnesium chloride and butylmagnesium chloride.

These compounds may be employed in combination of two or more kinds.

Concrete examples of the organoaluminum oxy-compound [B-2] are aluminoxanes represented by the following formula (1) or (2).

$$R_2Al-(OAl)_m-OAlR_2 \quad (1)$$
$$\qquad \qquad | \qquad \qquad$$
$$\qquad \qquad R \qquad \qquad$$

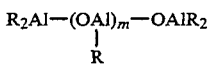
$\qquad \qquad (2)$

In the formulas (1) and (2), R is a hydrocarbon group such as a methyl group, an ethyl group, a propyl group or a butyl group, preferably a methyl group, an ethyl group, more preferably a methyl group; and m is an integer of 2 or more, preferably an integer of from 5 to 40.

The aluminoxane used herein may be formed from mixed alkyloxyaluminum units composed of an alkyloxyaluminum unit represented by the formula (OAl(R$^1$)) and an alkyloxyaluminum unit represented by the formula (OAL(R$^2$)), wherein each of R$^1$ and R$^2$ is exemplified by the similar hydrocarbons to those for the above R, and $R^1$ and $R^2$ are groups different from each other. In this case, preferred is aluminoxane formed from the mixed alkyloxyalumium units containing a methyloxyaluminum unit ($OAl(CH_3)$) generally in an amount of not less than 30% by mol, preferably not less than 50% by mol, particularly preferably not less than 70% by mol.

The organoaluminum oxy- compound [B-2] used in the invention may be aluminoxane hitherto known or such benzene-insoluble organoaluminum oxy compounds having been discovered by the present applicants.

The aluminoxane may be prepared, for example, by the following methods.

(1) A method wherein suspensions of compounds containing adsorbed water or salts containing water of crystallization, for example, magnesiumchloride hydrate, copper sulfate hydrate, aluminum sulfate hydrate, nickel sulfate hydrate and ceriun (I) chloride hydrate, in hydrocarbon solvents are allowed to react with an organoaluminum compound such as trialkylaluminum, and the desired aluminoxane is recovered as a hydrocarbon solution containing the same.

(2) A method wherein an organoaluminum compound such as trialkylaluminum is treated directly with water, ice or water vapor in such solvent as benzene, toluene, ethyl ether or tetrahydrofuran, and the desired aluminoxane is recovered as a hydrocarbon solution containing the same.

(3) A method wherein an organoaluminum compound such as trialkylaluminum is allowed to react with an organotin oxide in a solvent such as decane, benzene or toluene.

Of these, preferred is the method of (1). The aluminoxane as illustrated above may contain small amounts of organometallic components other than aluminum. From the above-mentioned solution containing aluminoxane as recovered, the solvent or unaltered organoaluminum compound is removed by distillation, and the remaining aluminoxane may dissolved again in a solvent.

The organoaluminum compound used in preparing the aluminoxane includes concretely trialkylaluminum such as trimethylaluminum, triethylaluminum, tripropylalminum, triisopropylaluminum, tri-n-butylaluminum, triisobutylaluminum, tri-sec-butylaluminum, tri-tert-butylaluminum, tripentylaluminum, trihexylaluminum, trioctylaluminum, tridecylaluminum, tricycloalkylaluminum such as tricyclohexylaluminum or tricyclooctylaluminum;

dialkylaluminum halide such as dimethylaluminum chloride, diethylaluminum chloride, diethylaluminum bromide or diisobutylaluminum chloride;

dialkylaluminum hydride such as diethylaluminum hydride or diisobutylaluminum hydride;

dialkylaluminum alkoxide such as dimethylaluminum methoxide or diethylaluminum ethoxide; and dialkylaluminum aryloxide such as diethylaluminum phenoxide.

Furthermore, the isoprenylaluminum represented by the general formula may also be used.

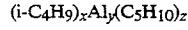

$(i-C_4H_9)_xAl_y(C_5H_{10})_z$ wherein x, y and z are each a positive number, and $z \geq 2x$.

Of these, trialkylaluminum is particularly preferred.

Solvents used in the solutions of aluminoxane include aromatic hydrocarbons such as benzene, toluene, xylene, cumene and cymene; aliphatic hydrocarbons such as pentane, hexane, heptane, octane, decane, dodecane, hexadecane and octadecane; alicyclic hydrocarbons such as cyclopentane, cyclohexane, cyclooctane and methylcyclopentane; petroleum fractions such as gasoline, kerosene and gas oil; or halogenated hydrocarbons such as halides, particularly chloride and bromides, of the above-mentioned aromatic, aliphatic and alicyclic hydrocarbons. In addition thereto, there may also be used ethers other than ethyl ether and tetrahydrofuran. Of these solvents as exemplified above, particularly preferred are aromatic hydrocarbons.

When the aforementioned transition metal compound catalyst component [A] is a solid titanium catalyst component [A-1] or a titanium trichloride catalyst component [A-2], the organometallic compound catalyst component [B] is preferably an organoaluminum compound [B-1]. When the transition metal compound catalyst component [A] is a metallocene compound [A-3], the organometallic compound catalyst component [B] is preferably an organoaluminum oxy-compound [B-2].

In the prepolymerization of an α-olefin and a polyene compound to a catalyst comprising the transition metal compound catalyst component [A] and the organometallic compound catalyst component [B], the aforementioned electron donor (a) or an electron donor (b) described below may be employed, if necessary.

Useful electron donor (b) is an organosilicon compound represented by the following formula:

$R_nSi(OR')_{4-n}$ wherein each of R and R' is a hydrocarbon group, and n is a number satisfying the condition of $0<n<4$.

Concrete examples of the organosilicon compounds represented by the above formula include:

trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, γ-aminopropyltriethoxysilane, chlorotriethoxysilane, ethyltrisipropoxysilane, vinyltributoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, methyltriallyoxysilane, vinyltris(β-methoxyethoxysilane), vinyltriacetoxysilane, dimethltetraethoxysilane, cyclopentyltrimethoxysilane, 2-methylcyclopentyltrimethoxysilane, 2,3-dimethylcyclopentyltrimethoxysilane, cyclopentyltriethoxysilane, dicyclopentyldimethoxysilane, bis(2-methylcyclopentyl)dimethoxysilane, bis(2,3-dimethylcyclopentyl)dimethoxysilane, dicyclopentyldiethoxysilane, tricyclopentylmethoxysilane, tricyclopentylethoxysilane, dicyclopentylmethylmethoxysilane, dicyclopentylethylmethoxysilane, hexenyltrimethoxysilane, dicyclopentylmethylethoxysilane, cyclopentyldimethylmethoxysilane, cyclopentyldiethylmethoxysilane, and cyclopentyldimethylethoxysilane.

Of these, preferably used are ethyltriethoxysilane, n-propyltriethoxysilane, t-butyltriethoxysilane, vinyltriethoxysilane, phenyltriethoxysilane, vinyltributoxysilane, diphenyldimethoxysilane, phenylmethyldimethoxysilane, bis-p-tolyldimethoxysilane, p-tolylmethyldimethoxysilane, dicyclohexyldimethoxysilane, cyclohexylmethyldimethoxysilane, 2-norbornanetriethoxysilane, 2-norbornanemethyldimethoxysilane, phenyltriethoxysilane, dicyclopentyldimethoxysilane, hexenyltrimethoxysilane, cyclopentyltriethoxysilane, tricyclopentylmethoxysilane and cyclopentyldimethylmethoxysilane.

The above-mentioned organosilicon compounds may be used in combination of two or more kinds.

Further, also employable as the electron donor (b) in the invention are:

2,6-substituted piperidines, 2,5-substituted piperidines;

substituted methylenediamines such as N,N,N'N'-tetramethylenediamine and N,N,N'N'-tetraethylmethylenediamine;

nitrogen-containing electron donors such as substituted methylenediamines (e.g., 1,3-dibenzylimidazolidine and 1,3-dibenzyl-2-phenylimidazolidine);

phosphorus-containing electron donors such as phosphites (e.g., triethyl phosphite, tri-n-propyl phosphite, triisopropyl phosphite, tri-n-butyl phosphite, triisobutyl phosphite, diethyl-n-butyl phosphite and diethylphenyl phosphite); and oxygen-containing electron donors such as 2,6-substituted tetrahydropyrans and 2,5-substituted tetrahydropyrans.

The above-mentioned electron donors (b) may be used in combination of two or more kinds.

For preparing the α-olefin/polyene copolymer-containing polymer [I] in the invention, in the first place, the aforementioned α-olefin and polyene compound are copolymerized to the transition metal compound catalyst component [A] and the organometallic compound catalyst component [B], to form a prepolymerized catalyst containing the α-olefin/polyene copolymer (i).

When the α-olefin and the polyene compound are prepolymerized to the transition metal compound catalyst component [A] and the organometallic compound catalyst component [B] in the invention, the polyene compound is used generally in an amount of 0.0001 to 10 mol, preferably 0.005 to 5 mol, especially preferably 0.001 to 2 mol per 1 mol of the α-olefin.

The copolymerization of the α-olefin and the polyene compound can be carried out by either a liquid phase polymerization such as solution polymerization and suspension polymerization, or a gas phase polymerization. When this polymerization is conducted in a liquid phase, it can be carried out in the presence of an inert solvent which will be described later. Further, the polymerization can be carried out using the olefins in a liquid state and/or the polyene compound as solvents or substantially not using a solvent.

In the invention, the prepolymerization (precopolymerization) can be carried out in the presence of an inert solvent which will be described later. In this case, the above-mentioned monomers and catalyst components are added to the inert solvent, and the precopolymerization is preferably conducted under relatively mild conditions. The prepolymerization may be carried out under such condition that the produced prepolymer would be either dissolved in the polymerization medium or not dissolved therein, but preferably carried out under such condition that the produced prepolymer is not dissolved in the polymerization medium.

In more concrete, the prepolymerized catalyst can be prepared in the invention by the following processes.

i) A process comprising bringing the transition metal compound catalyst component [A] and the organometallic compound catalyst component [B] and if necessary the electron donor into contact with each other in an inert solvent to form a catalyst, and then copolymerizing the α-olefin and the polyene compound to the obtained catalyst, to form a prepolymerized catalyst.

ii) A process comprising bringing the transition metal compound catalyst component [A] and the organometallic compound catalyst component [B] and if necessary the electron donor into contact with each other in a mixture of the α-olefin and the polyene compound to form a catalyst, and then copolymerizing the α-olefin and the polyene compound to the obtained catalyst, to form a prepolymerized catalyst.

Concrete examples of the above-mentioned inert solvents include:

aliphatic hydrocarbons such as propane, butane, pentane, hexane, heptane, octane, decane, dodecane and kerosine;

alicyclic hydrocarbons such as cyclopentane, cyclohexane and methylcyclopentane;

aromatic hydrocarbons such as benzene, toluene and xylene;

halogenated hydrocarbons such as α-olefin chloride and chlorobenzene; and mixtures of these hydrocarbons.

Of these, preferably used are aliphatic hydrocarbons.

The prepolymerization can be carried out by any process of a batch process, a semi-continuous process and a continuous process.

The concentrations of the catalyst components in the prepolymerization vary depending on the catalyst components used. The transition metal compound catalyst component is used in an amount (per 1 liter of the polymerization volume) of generally about 0.001 to 5,000 mmol, preferably about 0.01 to 1,000 mmol, more preferably 0.1 to 500 mmol, in terms of the transition metal atom.

The organometallic compound catalyst component is used in such an amount that a polymer would be produced in an amount of 0.01 to 2,000 g, preferably 0.03 to 1,000 g, more preferably 0.05 to 200 g, per 1 g of the transition metal compound catalyst component, that is, the organometallic compound catalyst component is used in an amount of generally about 0.1 to 1,000 mol, preferably about 0.5 to 500 mol, more preferably 1 to 100 mol, per 1 mol of the transition metal atom contained in the transition metal compound catalyst component.

In the case of using an electron donor in the prepolymerization, the amount of the electron donor is in the range of 0.01 to 50 mol, preferably 0.05 to 30 mol, more preferably 0.1 to 10 mol, per 1 mol of the transition metal atom contained in the transition metal compound catalyst component.

The reaction temperature in the prepolymerization is desired to be in the range of usually about $-20°$ to $+100°$ C., preferably about $-20°$ to $+80°$ C., more preferably $-10°$ to $+40°$ C.

A molecular weight regulator such as hydrogen can be used in the prepolymerization.

The prepolymerized catalyst employable in the invention can be obtained by copolymerizing the above-mentioned α-olefin and polyene compound to the transition metal compound catalyst component [A] and the organometallic compound catalyst component [B], in the total amounts of the α-olefin and the polyene compound of 0.01 to 2,000 g, preferably 0.03 to 1,000 g, more preferably 0.05 to 200 g, per 1 g of the transition metal compound catalyst component.

The prepolymerized catalyst containing the α-olefin/polyene copolymer (i) is obtained generally in the form of a suspension. The prepolymerized catalyst in the form of a suspension can be per se used in the subsequent polymerization, or a prepolymerized catalyst obtained by separating from the suspension can be also used in the subsequent polymerization.

When the prepolymerized catalyst in the form of a suspension per se is used in the subsequent polymerization, the prepolymerized catalyst may be used singly without combining the organometallic catalyst component [II] and the electron donor [III].

In the invention, prior to the precopolymerization, olefin may be beforehand prepolymerized to the transition metal compound catalyst component [A] and the organometallic compound catalyst component [B].

As the olefin used herein, the aforementioned olefins can be employed. Of these, preferably used are α-olefins, and more preferably used is propylene.

If the olefin is beforehand prepolymerized to the catalyst for olefin polymerization prior to the precopolymerization, there can be obtained for example the following effect. That is, when the olefin is beforehand prepolymerized to the catalyst for olefin polymerization, a prepolymerized catalyst excellent in particle properties such as particle diameter distribution and particle size distribution can be obtained.

In the next place, the aforementioned olefin is polymerized or copolymerized to the prepolymerized catalyst obtained as above, to form an olefin polymer (ii).

For forming the olefin polymer (ii), the prepolymerized catalyst is used in an amount (per 1 liter of the polymerization volume) of usually about 0.001 to 100 mmol, preferably about 0.005 to 20 mmol, in terms of the transition metal atom.

In the formation of the olefin polymer (ii), the organometallic compound catalyst component [B] or an electron donor may be further employed, in addition to the prepolymerized catalyst.

In the case of using the organometallic compound catalyst component [B], the amount thereof is such an amount that the metal atoms contained in the catalyst component [B] would be usually about 1 to 2,000 mol, preferably about 2 to 500 mol, per 1 mol of the transition metal atom contained in the prepolymerized catalyst in the polymerization system. In the case of using the electron donor, the amount thereof is usually in the range of about 0.001 to 10 mol, preferably 0.01 to 5 mol, per 1 mol of the metal atom contained in the organometallic compound catalyst component [B].

If hydrogen is used in the polymerization, the molecular weight of the resulting polymer can be regulated, and the obtained polymer has a high melt flow rate.

In the invention, the polymerization of olefin can be carried out by either a liquid phase polymerization such as solution polymerization and suspension polymerization, or a gas phase polymerization. Further, the polymerization of olefin can be carried out either batchwise, semi-continuously or continuously.

When the polymerization reaction is carried out in the form of a slurry polymerization, the aforementioned inert organic solvents may be used as the reaction solvent, or olefins which are liquid at the reaction temperature may be used as the reaction solvent.

The conditions for the polymerization depend on the olefin used, but the polymerization temperature is generally in the range of about $-20°$ to $300°$ C., preferably about $-20°$ to $150°$ C., more preferably $-10°$ to $130°$ C., and the polymerization pressure is generally in the range of a normal pressure to $100$ kg/cm$^2$, preferably about 2 to 50 kg/cm$^2$.

Further, the polymerization may be carried out in two or more steps having reaction conditions different from each other.

The olefin polymer (ii) thus obtained may be a homopolymer of olefin. Otherwise, it may be a random copolymer or a block copolymer composed of olefins of two or more kinds.

The olefin polymer [II] contained in the olefin polymer composition of the present invention is described below.

As the olefin polymer [II] employable for the invention, there can be mentioned a variety of conventionally known α-olefin polymers of 2–20 carbon atoms and copolymers. Concrete examples of the olefin polymer [II] include high-density α-polyolefin, low-density α-polyolefin, linear low-density α-polyolefin, polypropylene, polybutene, poly(4-methyl-1-pentene), polypentene, α-olefin/propylene copolymer, α-olefin/butene copolymer, propylene/butene copolymer, α-olefin/propylene/butene copolymer, 4-methyl-1-pentene/olefin copolymer, α-olefin/cyclic olefin copolymer, α-olefin/propylene/polyene compound copolymer, various propylene type block copolymers, propylene type random copolymers, and mixtures thereof.

Of these, preferably used as the olefin polymer [II] are polymers of olefins which are the same as those for forming the olefin polymer (ii) contained in the α-olefin/polyene copolymer-containing polymer [I].

The olefin polymer composition according to the present invention contains the α-olefin/polyene copolymer-containing polymer [I] in an amount of 0.005 to 99% by weight, preferably 0.01 to 90% by weight, more preferably 0.03 to 85% by weight, most preferably 0.05 to 80% by weight, and contains the olefin polymer [II] in an amount of 99.995 to 1% by weight, preferably 99.99 to 10% by weight, more preferably 99.97 to 15% by weight, most preferably 99.95 to 20% by weight.

The olefin polymer composition of the invention is prepared by blending (kneading) the α-olefin/polyene copolymer-containing polymer [I] and the olefin polymer [II] in the above-mentioned amounts. In concrete, the α-olefin/polyene copolymer-containing polymer [I]

and the olefin polymer [II] are kneaded at a temperature of 100° to 350° C., preferably 150° to 300° C., using various kneading machines which are conventionally used for kneading polymers.

The olefin polymer composition of the invention has a higher melt tension as compared with conventionally known olefin polymers such as the above-mentioned olefin polymer [II].

In the olefin polymer composition of the invention, the melt tension and the melt flow rate satisfy the following relation.

When the olefin polymer [II] is propylene homopolymer, the melt tension and the melt flow rate in the olefin polymer composition satisfy the following relation:
generally, $\log[MT] \geq -0.8 \log[MFR] + 0.28$;
preferably, $\log[MT] \geq -0.8 \log[MFR] + 0.30$;
more preferably, $\log[MT] \geq -0.8 \log[MFR] + 0.33$.

Further when the olefin polymer [II] is propylene randompolymer, the melt tension and the melt flow rate of the olefin polymer composition of the invention satisfy the above-mentioned relation.

In contrast, in the case of only the above-mentioned polypropylene (olefin polymer [II]), the melt tension and the melt flow rate in this olefin polymer satisfy the following relation:
generally, $\log[MT] \geq -0.8 \log[MFR] + 0.24$.

Further, when a melt tension of an α-olefin/polyene copolymer-containing polymer [I] is represented as $MT_I$, a melt tension of an olefin polymer [II] is represented as $MT_{II}$, a melt tension of an α-olefin polymer composition comprising the α-olefin/polyene copolymer-containing polymer [I] and the olefin polymer [II] is represented as MT, a weight percentage of the α-olefin/polyene copolymer-containing polymer [I] is represented as $W_I$ and a weight percentage of the olefin polymer [II] is represented as $W_{II}$, these $MT_I$, $MT_{II}$, MT, $W_I$ and $W_{II}$ satisfy the following relations:

$$MT \geq \frac{W_I}{W_I + W_{II}} \times MT_I + \frac{W_{II}}{W_I + W_{II}} \times MT_{II}$$

preferably $$MT \geq \frac{W_I}{W_I + W_{II}} \times MT_I + \frac{W_{II}}{W_I + W_{II}} \times MT_{II} + 0.03 \times MT_{II}$$

more preferably $$MT \geq \frac{W_I}{W_I + W_{II}} \times MT_I + \frac{W_{II}}{W_I + W_{II}} \times MT_{II} + 0.05 \times MT_{II}$$

most preferably $$MT \geq \frac{W_I}{W_I + W_{II}} \times MT_I + \frac{W_{II}}{W_I + W_{II}} \times MT_{II} + 0.10 \times MT_{II}$$

Accordingly, the olefin polymer composition of the invention has a higher melt tension as compared with the conventional olefin polymers.

Such olefin polymer composition can be utilized for various purposes because of its high melt tension, and accordingly the use applications of the olefin polymer composition can be extended.

For example, an inflation film having good appearance, high transparency, high strength, etc. can be produced with a high copolymer and a high yield from the olefin copolymer composition.

The olefin polymer composition is used as a vacuum molding material or an air-pressure molding material, and can be subjected to a deep drawing in the molding stage. Moreover, the olefin polymer composition can be formed into a large sized vacuum molded product or a large sized air-pressure molded product.

Further, from the olefin polymer composition, a container (e.g., bottle) of high strength and large size can be produced by a blow molding.

Furthermore, from the olefin polymer composition, a sheet or a calendered product in a form of a film almost free from uneven thickness and showing high glossiness can be produced by a calendering.

Still further, from the olefin polymer composition, a foamed product having a high foaming rate and containing uniform foams can be obtained.

In addition, the olefin polymer composition can be molded by other various molding processes such as extrude molding and stretch molding.

Among the olefin polymer compositions provided by the present invention, an olefin polymer composition containing the α-olefin/polyene copolymer-containing polymer [I] of specific composition and specific melt tension in a large amount can be favorably employed as a master batch.

In the case of using the olefin polymer composition of the invention as a master batch, the α-olefin/polyene copolymer-containing polymer [I] which contains the α-olefin/polyene copolymer (i) in a large amount is employed. Concretely, in the α-olefin/polyene copolymer-containing polymer [I], the α-olefin/polyene copolymer (i) is contained in an amount of 15 to 99% by weight, preferably 20 to 90% by weight, more preferably 22 to 88% by weight, and the olefin polymer (ii) is contained in an amount of 85 to 1% by weight, preferably 80 to 10% by weight, more preferably 78 to 12% by weight.

The melt tension of the α-olefin/polyene copolymer-containing polymer [I] used herein is usually not less than 20 g, preferably not less than 25 g, more preferably not less than 30 g when the MFR of the copolymer is 2 g/10 min.

The melt tension of the composition for master batch is sometimes unmeasurable because strands thereof are unable to be tensed in the form of a thread.

The olefin polymer composition used as the master batch contains the α-olefin/polyene copolymer-containing polymer [I] of the above-mentioned specific composition in an amount of 0.005 to 99% by weight, preferably 0.01 to 95% by weight, more preferably 0.02 to 90% by weight, and contains the olefin polymer [II] in an amount of 99.995 to 1% by weight, preferably 99.99 to 5% by weight, more preferably 99.98 to 10% by weight.

In the use of such master batch, the master batch is further blended with an olefin polymer. As the olefin polymer to be blended with the master batch, an olefin polymer which is the same as the olefin polymer [II] is favorably employed. If the master batch containing the olefin polymer [II] is further blended with an olefin polymer which is the same as the olefin polymer [II], there can be easily obtained an olefin polymer composition having a composition ratio of the components desired for the molding stage, because they are compatible with each other.

The olefin polymer composition according to the invention may further contain various stabilizers, an antistatic agent, an antiblocking agent, a lubricant, a nucleating agent, a pigment, a dye, an inorganic filler, an organic filler, etc.

If a phenol type stabilizer is added to the olefin polymer composition of the invention, a molded product improved in the heat stability and the transparency can be obtained, so that the addition of the phenol type stabilizer is preferred. If both of a phenol type stabilizer and an organic phosphite type stabilizer are added to the olefin polymer composition of the invention, a molded product much more improved in the heat stability and the transparency can be obtained, so that the addition of the phenol type stabilizer and the organic phosphite type stabilizer is particularly preferred.

Further, if a metal salt of higher aliphatic acid is added to the olefin polymer composition of the invention, the resin can be enhanced in the heat stability during the molding stage, and troubles associated with rust and corrosion of a molding machine caused by a halogen gas released from the catalyst can be restrained. Particularly, a combination of a phenol type stabilizer and/or an organic phosphite type stabilizer and a metal salt of higher aliphatic acid is preferably employed.

Concrete examples of the phenolic stabilizers include 2,6-di-tert-butyl-4-methylphenol,
2,6-di-tert-butyl-4-ethylphenol,
2,6-dicyclohexyl-4-methylphenol,
2,6-diisopropyl-4-ethylphenol,
2,6-di-tert-amyl-4-methylphenol,
2,6-di-tert-octyl-4-n-propylphenol,
2,6-dicyclohexyl-4-n-octylphenol,
2-isopropyl-4-methyl-6-tert-butylphenol,
2-tert-butyl-2-ethyl-6-tert-octylphenol,
2-isobutyl-4-ethyl-5-tert-hexylphenol,
2-cyclohexyl-4-n-butyl-6-isopropylphenol,
styrenated mixed cresols,
dl-a-tocopherol,
tert-butylhydroquinone,
2,2'-methylenebis(4-methyl-6-tert-butylphenol),
4,4'-butylidenebis(3-methyl-6-tert-butylphenol),
4,4'-thiobis(3-methyl-6-tert-butylphenol),
2,2'-thiobis(4-methyl-6-tert-butylphenol),
4,4'-methylenebis(2,6-di-tert-butylphenol),
2,2'-methylenebis[6-(1-methylcyclohexyl)-p-cresol],
2,2'-ethylidenebis(4,6-di-tert-butylphenol),
2,2'-butylidenebis(2-tert-butyl-4-methylphenol),
1,1,3-tris(2-methyl-4-hydroxy-5-tert-butylphenyl)butane,
triethylene glycol-bis[3-(3-tert-butyl-5-methyl-4-hydroxyphenyl)propionate],
1,6-hexanediol-bis[3-(3,5-di-tert-butyl-4-hydroxyphenyl)propionate],
2,2'-thiodiethylenebis[3-(3,5-di-tert-butyl-4-hydroxyphenyl)propionate],
N,N'-hexamethylenebis(3,5-di-tert-butyl-4-hydroxyhydrocinnamamide),
3,5-di-tert-butyl-4-hydroxybenzyl phosphonate diethyl ester,
1,3,5-tris(2,6-dimethyl-3-hydroxy-4-tert-butylbenzyl) isocyanurate,
1,3,5-tris[(3,5-di-tert-butyl-4-hydroxyphenyl)propionyloxyethyl]isocyanurate,
tris(4-tert-butyl-2,6-dimethyl-3-hydroxybenzyl) isocyanurate,
2,4-bis(n-octylthio)-6-(4-hydroxy-3,5-di-tert-butylanilino)-1,3,5-triazine,
tetrakis[methylene-3-(3,5-di-tert-butyl-4-hydroxyphenyl)propionate]methane,
bis(3,5-di-tert-butyl-4-hydroxybenzylphosphonic acid ethyl ester) calcium,
bis(3,5-di-tert-butyl-4-hydroxybenzylphosphonic acid ethyl ester) nickel,
bis[3,3-bis(3-tert-4-hydroxyphenyl)butyric acid]glycol ester,
N,N'-bis[3-(3,5-di-tert-butyl-4-hydroxyphenyl)propionyl]hydrazine,
2,2'-oxamidobis[ethyl-3-(3,5-di-tert-butyl-4-hydroxyphenyl)propionate],
bis[2-tert-butyl-4-methyl-6-(3-tert-butyl-5-methyl-2-hydroxybenzyl)phenyl]terephthalate,
1,3,5-trimethyl-2,4,6-tris(3,5-di-tert-butyl-4-hydroxybenzyl)benzene,
3,9-bis[1,1-dimethyl-2-{b-(3-tert-butyl-4-hydroxy-5-methylphenyl)propionyloxy}ethyl]-2,4,8,10-tetraoxaspiro[5,5]-undecane,
2,2-bis[4-(2-(3,5-di-tert-butyl-4-hydroxyhydrocinnamoyloxy))ethoxyphenyl]propane, and
alkyl esters of b-(3,5-di-tert-butyl-4-hydroxyphenyl)-propionic acid.

Of the alkyl esters of b-(3,5-di-tert-butyl-4-hydroxyphenyl)-propionic acid mentioned above, particularly preferred are alkyl esters having alkyl group of not greater than 18 carbon atoms.

Furthermore, phenolic stabilizers having structures in those molecules illustrated with

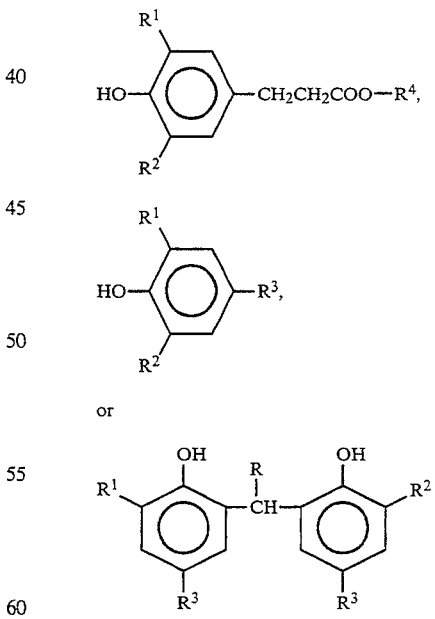

are preferred.

Wherein R is a hydrogen atom or an alkyl group having 1–6 carbons, $R^1$ and $R^2$ are respectively an alkyl group having 1–6 carbons, $R^3$ is an alkyl group having 1–6 carbons or an alkoxy groups having 1–6 carbons. $R^4$ is an alkyl group having 1–22 carbons or a group including a structure as follows:

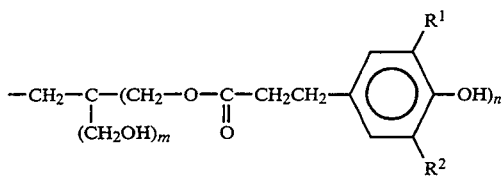

(wherein m + n = 3, n = 0,1,2, or 3)

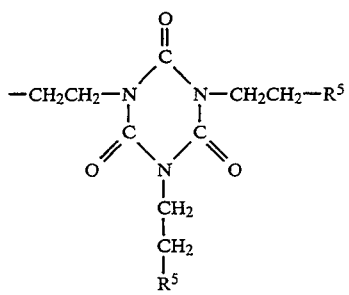

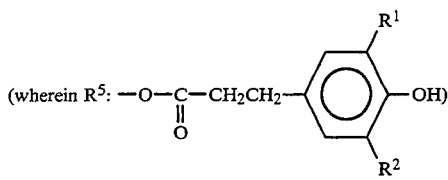

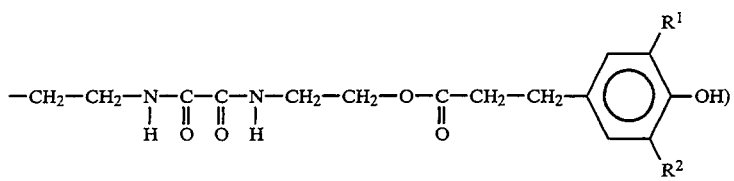

Of these compounds, preferred are
2,6-di-tert-butyl-4-methylphenol,
stearyl ester of b-(4-hydroxy-3,5-di-tert-butylphenol)-propionic acid,
2,2'-ethylidene bis(4,6-di-tert-butyl phenol),
tetrakis[methylene 3-(3,5-di-tert-butyl-4-hydroxyphenyl)propionate]methane.

These phenolic stabilizers are used singly or in combination.

Concrete examples of the organic phosphite stabilizers include trioctyl phosphite,
trilauryl phosphite,
tristridecyl phosphite,
trisisodecyl phosphite,
phenyl diisooctyl phosphite,
phenyl diisodecyl phosphite,
phenyl di(tridecyl) phosphite,
diphenyl isooctyl phosphite,
diphenyl isodecyl phosphite,
diphenyl tridecyl phosphite,
triphenyl phosphite,
tris(nonylphenyl) phosphite,
tris(2,4-di-tert-butylphenyl) phosphite,
tris(butoxyethyl) phosphite,
tetra(tridecyl)-4,4'-butylidenebis (3-methyl-6-tert-butyl-phenol) diphosphite,
4,4'-isopropylidenediphenol alkylphosphite (alkyl group has about 12 to 15 carbon atoms),
4,4'-isopropylidenebis (2-tert-butylphenol) di(nonylphenyl) phosphite,
tris(biphenyl) phosphite,
tetra(tridecyl)-1,1,3-tris(2-methyl-5-tert-butyl-4-hydroxyphenyl)butane diphosphite,
tris(3,5-di-tert-butyl-4-hydroxyphenyl) phosphite,
hydrogenated-4,4'-isopropylidenediphenol polyphosphite,
bis(octylphenyl).bis[4,4'-butylidenebis(3-methyl-6-tert-butylphenol)].1,6-hexanediol diphosphite,
hexa(tridecyl)-1,1,3-tri(2-methyl-4-hydroxy-5-tert-butylphenol)diphosphite,
tris[4,4'-isopropylidenebis(2-tert-butylphenol)]phosphite,
tris(1,3-distearoyloxyisopropyl) phosphite,
9,10-dihydro-9-phosphaphenanthrene-10-oxide, and
tetrakis(2,4-di-tert-butylphenyl)-4,4'-biphenylene diphosphite.

Of these compounds, preferred are tris(2,4-di-tert-butylphenyl)phosphite,
tris(nonylphenyl)phosphite, and
tetrakis(2,4-di-tert-butylphenyl)-4,4'-biphenylene diphosphonite.

Furthermore, tris(2,4-di-tert-butylphenyl)phosphite is particularly preferred.

In addition, phosphite stabilizers derived from pentaerythritiol having the formula illustrated below are also used:

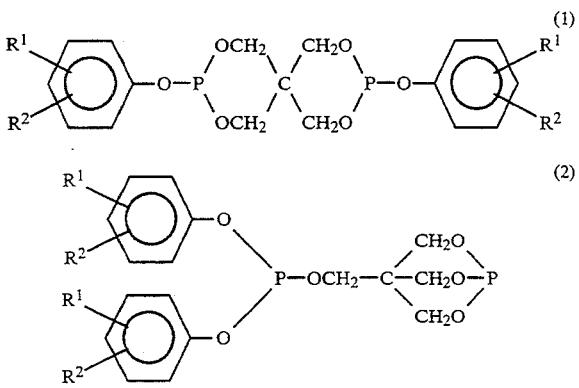

In the formula (1) and the formula (2) illustrated above, $R^1$ and $R^2$ are respectively an alkyl group.

These organic phosphite stabilizers are used singly or in combination.

Examples of metal salts of the higher aliphatic acid are alkali metal salts, alkaline earth metal salts and other metal salts of saturated or unsaturated carbonic acids including 12 to 40 carbon atoms. Saturated or unsaturated carbonic acids including 12 to 40 carbon atoms mentioned above may have substituent groups such as hydroxy groups.

Examples of saturated or unsaturated carbonic acid including 12 to 40 carbon atoms are stearic acid, oleic acid, lauric acid, capric acid, arachidonic acid, palmitic acid, behenic acid, 12-hydroxystearic acid and montanic acid, and furthermore examples of metals which can form salts to react with these higher aliphatic acids are alkaline earth metals such as magnesium, calcium and barium, alkali metals such as sodium, potassium and lithium, and also other metals such as cadmium, zinc and lead.

Concrete examples of the higher aliphatic acid metal salts include magnesium stearate, magnesium laurate, magnesium palmitate, calcium stearate, calcium oleate, calcium laurate, barium stearate, barium oleate, barium laurate, barium arachidate, barium behenate, zinc stearate, zinc oleate, zinc laurate, lithium stearate, sodium stearate, sodium palmitate, sodium laurate, potassium stearate, potassium laurate, calcium 12-hydroxystearate, sodium montanate, calcium montanate and zinc montanate.

Of these higher aliphatic acid metal salts, particularly zinc salts of saturated aliphatic acids having 12 to 35 carbon atoms are preferably used.

These higher aliphatic acid metal salts are used singly or in combination.

When the stabilizers described above are used, the phenolic stabilizers are used in an amount of generally 0.01–1.0% by weight, preferably 0.02–0.5% by weight, more preferably 0.03–0.2% by weight, in the olefin polymer composition.

The organic phosphite stabilizers are used in an amount of generally 0.01–1.0% by weight, preferably 0.02–0.5% by weight, more preferably 0.03–0.2% by weight, in the olefin polymer composition.

The metal salts of heigher aliphatic acid are used in an amount of generally 0.01–1.0% by weight, preferably 0.02–0.5% by weight, more preferably 0.03–0.2% by weight, in the olefin polymer composition.

EFFECT OF THE INVENTION

The olefin polymer composition according to the invention has a higher melt tension as compared with conventional olefin polymers. Such olefin polymer composition is excellent in a moldability in the inflation molding, and can be molded into a film or the like at a high speed with a high yield. Further, various molding processes such as a blow molding, a vacuum molding, an air-pressure molding, a foam molding, a calendering, extrude molding and stretch molding can be applied to the olefin polymer composition, and hence uses of the olefin polymer composition can be extended.

The present invention is further illustrated by the following examples, but the invention is in no way restricted to those examples.

EXAMPLE

Example 1

[Preparation of solid titanium catalyst component [A]]

95.2 g of anhydrous magnesium chloride, 442 ml of decane and 390.6 g of 2-ethylhexyl alcohol were mixed and heated at 130° C. for 2 hours to give a homogeneous solution. Then, to the solution was added 21.3 g of phthalic anhydride, and they were mixed and stirred with each other at 130° C. for 1 hour to dissolve the phthalic anhydride in the solution. Thus obtained homogeneous solution was cooled to room temperature, and then 75 ml of the homogeneous solution was dropwise added to 200 ml of titanium tetrachloride kept at −20° C. over a period of 1 hour. After the addition was completed, the temperature of the resulting mixture liquid was raised to 110° C. over a period of 4 hours. When the temperature of the mixture liquid reached 110° C., 5.22 g of diisobutyl phthalate (DIBP) was added to the mixture liquid, and then the resulting mixture was stirred at the same temperature for 2 hours.

After the reaction was completed, a solid portion was recovered from the reaction liquid by means of hot filtration. The solid portion was suspended again in 275 ml of titanium tetrachloride, and the obtained suspension was further heated at 110° C. for 2 hours. After the reaction was completed, a solid portion was recovered again by means of hot filtration. The solid portion was well washed with decane and hexane at 110° C. until no titanium compound liberating in the solution was detected.

The solid titanium catalyst component [A] prepared as above was stored as a decane slurry. A part of the slurry was dried to examine the catalyst composition. As a result, the solid titanium catalyst component [A] obtained as above had a composition comprising 2.4% by weight of titanium, 60% by weight of chlorine, 20% by weight of magnesium and 13.0% by weight of DIBP.

[Preparation of prepolymerized catalyst [B]-1]

Into a 400 ml four-necked glass reactor equipped with a stirrer, 200 ml of purified hexane, 6 mmol of triethylaluminum and 2.0 mmol (in terms of titanium atom) of the above-obtained solid titanium catalyst component [A] were charged in a nitrogen atmosphere. Then, into the reactor was further fed propylene at a rate of 6.4 liter/hour at 20° C. for 1 hour.

When feeding of the propylene was completed, the reactor was purged with nitrogen, and a washing operation consisting of removal of the supernatant liquid and addition of purified hexane was carried out twice. Thereafter, the obtained reaction liquid was suspended again using purified hexane, and all of the resulting suspension was transferred into a catalyst bottle to obtain a prepolymerized catalyst [B]-1.

Preparation of ethylene/polyene copolymer-containing polymer [I]-1

[Copolymerization of ethylene and polyene]

Into a 400 ml four-necked glass reactor equipped with a stirrer, 334 ml of purified hexane, 2 ml of 1,9-decadiene, 10 mmol of diethylaluminum chloride and 1.0 mmol (in terms of titanium atom) of the above-obtained prepolymerized catalyst [B]-1 were charged in a nitrogen atmosphere. Then, into the reactor was further fed ethylene at 0° C., and feeding of the ethylene was terminated when the ethylene was reacted in an amount of 28 liters.

When the feeding of ethylene was completed, the reactor was purged with nitrogen, and then 5 ml of the resulting slurry was sampling out to measure a conversion of 1,9-decadiene, and thereafter a washing operation consisting of removal of the supernatant liquid and addition of purified hexane was carried out twice. Thereafter, the obtained reaction liquid was suspended again using purified hexane, and all of the resulting suspension was transferred into a catalyst bottle to obtain a prepolymerized catalyst [C]-1 containing an ethylene/polyene copolymer (i).

In the prepolymerized catalyst [C]-1 thus obtained, an ethylene/1,9-decadiene copolymer was produced in an amount of 15.3 g based on 1 g of the transition metal compound catalyst component.

Further the conversion of 1,9-decadiene was 58 mol % and therefore the ethylene/1,9-decadiene copolymer contains constituent units derived from ethylene in an amount of 99.41 mol % and constituent units derived from 1,9-decadiene in an amount of 0.59 mol %.

The melt flow rate (MFR) of the ethylene/1,9-decadiene copolymer was determined as follows. A large amount of isobutyl alcohol containing a small amount of hydrochloric acid was added to the prepolymerized catalyst [C]-1 obtained above. The resulting mixture was stirred for 30 minutes at 60° C. to remove a catalyst residue. After the stirring was completed, a slurry containing the produced solid was filtered to separate a polymer from the slurry. The polymer was dried at 70° C. under a reduced pressure to prepare an ethylene/1,9-decadiene copolymer. The melt flow rate of the thus prepared ethylene/1,9-decadiene copolymer was determined by the method as described before, and found to be less than the measurable lower limit (i.e. less than 0.01 dg/min).

[Polymerization of olefin]

Into a 1-liter five-necked glass reactor equipped with a stirrer, 600 ml of purified heptane was charged in a nitrogen atmosphere, and then the temperature in the reactor was raised to 60° C. Subsequently, into the reactor, 30 mmol of triethylaluminum, 3 mmol of cyclohexylmethyldimethoxysilane (CMMS) and 0.6 mmol (in terms of titanium atom) of the above-obtained prepolymerized catalyst [C]-1 were fed, and then propylene and hydrogen were further fed at feeding rates of 150 liter/hour and 0.2 liter/hour, respectively, to perform a polymerization for 60 minutes. The temperature in the polymerization was kept at 70° C.

The polymerization reaction was terminated by adding a large amount of isobutyl alcohol containing a small amount of a hydrochloric acid, and the gas fed into the reactor was changed to nitrogen. The resulting mixture was stirred for 30 minutes at 60° C. to remove a catalyst residue.

After the stirring was completed, a slurry containing the produced solid was filtered thereby to separate a polymer from the slurry. The polymer was dried at 70° C. under a reduced pressure to obtain 195.2 g of an ethylene/polyene copolymer-containing polymer [I]-1. The melt flow rate (MFR) of the ethylene/polyene copolymer-containing polymer [I]-1 was 11.2 dg/min. The melt tension of the ethylene/polyene copolymer-containing polymer [I]-1 was 4.9 g.

The ethylene/polyene copolymer-containing polymer [I]-1 obtained as above had a composition comprising an ethylene/polyene copolymer in an amount of 13.2% by weight and an olefin polymer in an amount of 86.8% by weight.

[Preparation of polypropylene composition]

21.8 parts by weight of the above-obtained ethylene/polyene copolymer-containing polymer [I]-1, 1 part by weight of calcium stearate, 1 part by weight of 3,5-di-t-butyl-4-hydroxytoluene, 1 part by weight of tetrakis[methylene (3,5-di-t-butyl-4-hydroxy)hydrocinnamate]methane and 1,000 parts by weight of a propylene homopolymer [II] (MFR: 1.5 dg/min, residue of extraction by means of boiling heptane: 98.0%) were mixed with each other. The resulting mixture was granulated and pelletized using an extruder of 20 mm$\phi$.

The melt tension (MT) of the polypropylene composition thus obtained was 1.7 g, and the melt flow rate (MFR) thereof was 1.8 dg/min.

Example 2

[Copolymerization of propylene and 1,9-decadiene]

Into a 400 ml four-necked glass reactor equipped with a stirrer, 334 ml of purified hexane, 2 ml of 1,9-decadiene, 10 mmol of triethylaluminum, 2 mmol of cyclohexylmethyldimethoxysilane (CMMS) and 1.0 mmol (in terms of titanium atom) of the solid titanium catalyst component [A] obtained in Example 1 were charged in a nitrogen atmosphere. Then, into the reactor was further fed propylene at 20° C., and feeding of the propylene was terminated when the propylene was reacted in an amount of 16 liters.

When the feeding of propylene was completed, the reactor was purged with nitrogen, and then 5 ml of the resulting slurry was sampling out to measure a conversion of 1,9-decadiene, and thereafter a washing operation consisting of removal of the supernatant liquid and addition of purified hexane was carried out twice. Thereafter, the obtained reaction liquid was suspended again using purified hexane, and all of the resulting suspension was transferred into a catalyst bottle to obtain a prepolymerized catalyst [C]-2.

In the prepolymerized catalyst [C]-2 thus obtained, a propylene/1,9-decadiene copolymer was produced in an amount of 15.2 g based on 1 g of the transition metal compound catalyst component.

Further the conversion of 1,9-decadiene was 43 mol % and therefore the propylene/1,9-decadiene copolymer contains constituent units derived from propylene in an amount of 99.34 mol % and constituent units derived from 1,9-decadiene in an amount of 0.66 mol %.

The melt flow rate of the propylene/1,9-decadiene copolymer was determined in the same manner as in Example 1, and found to be less than the measurable lower limit (i.e., less than 0.01 dg/min).

[Polymerization of olefin]

Into a 1-liter five-necked glass reactor equipped with a stirrer, 600 ml of purified heptane was charged in a nitrogen atmosphere, and then the temperature in the reactor was raised to 60° C. Subsequently, into the reactor, 30 mmol of triethylaluminum, 3 mmol of cyclohexylmethyldimethoxysilane (CMMS) and 0.6 mmol (in terms of titanium atom) of the above-obtained prepolymerized catalyst [C]-2 were fed, and then propylene and hydrogen were further fed at feeding rates of 150 liter/hour and 0.2 liter/hour, respectively, to perform a polymerization for 60 minutes. The temperature in the polymerization was kept at 70° C.

The polymerization reaction was terminated by adding a large amount of isobutyl alcohol containing a small amount of a hydrochloric acid, and the gas fed into the reactor was changed to nitrogen. The resulting mixture was stirred for 30 minutes at 60° C. to remove a catalyst residue.

After the stirring was completed, a slurry containing the produced solid was filtered thereby to separate a polymer from the slurry. The polymer was dried at 70° C. under a reduced pressure to obtain 182.3 g of a propylene/1,9-decadiene copolymer-containing polymer [I]-2.

The MFR of the propylene/1,9-decadiene copolymer-containing polymer [I]-2 thus obtained was 9.9 dg/min. The melt tension of the propylene/1,9-decadiene copolymer-containing polymer [I]-2 was 4.4 g.

The propylene/1,9-decadiene copolymer-containing polymer [I]-2 had a composition comprising an propylene/1,9-decadiene copolymer in an amount of 14.0% by weight and an olefin polymer in an amount of 86.0% by weight.

[Preparation of polypropylene composition]

14 parts by weight of the above-obtained propylene/1,9-decadiene copolymer-containing polymer [I]-2, 1 part by weight of calcium stearate, 1 part by weight of 3,5-di-t-butyl-4-hydroxytoluene, 1 part by weight of tetrakis[methylene(3,5-di-t-butyl-4-hydroxy)hydrocinnamate]methane and 1,000 parts by weight of polypropylene [II] (homopolymer) (MFR: 1.5 dg/min, residue of extraction by means of boiling heptane: 98.0%) were mixed with each other. The resulting mixture was granulated and pelletized using an extruder of 20 mm$\phi$.

The melt tension (MT) of the polypropylene composition thus obtained was 1.6 g, and the melt flow rate (MFR) thereof was 1.9 dg/min.

Example 3

[Polymerization of olefin]

Into a 1-liter five-necked glass reactor equipped with a stirrer, 600 ml of purified heptane was charged in a nitrogen atmosphere, and then the temperature in the reactor was raised to 60° C. Subsequently, into the reactor, 30 mmol of triethylaluminum, 3 mmol of cyclohexylmethyldimethoxysilane (CMMS) and 0.6 mmol (in terms of titanium atom) of the prepolymerized catalyst [C]-1 obtained in Example 1 were fed, and then propylene and hydrogen were further fed at feeding rates of 150 liter/hour and 0.2 liter/hour, respectively, to perform a polymerization for 25 minutes. The temperature in the polymerization was kept at 70° C.

The polymerization reaction was terminated by adding a large amount of isobutyl alcohol containing a small amount of a hydrochloric acid, and the gas fed into the reactor was changed to nitrogen. The resulting mixture was stirred for 30 minutes at 60° C. to remove a catalyst residue.

After the stirring was completed, a slurry containing the produced solid was filtered thereby to separate a polymer from the slurry. The polymer was dried at 70° C. under a reduced pressure to obtain 98.3 g of an propylene/polyene copolymer-containing polymer [I]-3. The melt flow rate (MFR) of the propylene/polyene copolymer-containing polymer [I]-3 was 8.0 dg/min. The melt tension of the propylene/polyene copolymer-containing polymer [I]-3 was 8.4 g.

The propylene/polyene copolymer-containing polymer [I]-3 obtained as above had a composition comprising an propylene/polyene copolymer in an amount of 25.7% by weight and an olefin polymer in an amount of 74.3% by weight.

[Preparation of polypropylene composition for master batch]

50 parts by weight of the above-obtained propylene/polyene copolymer-containing polymer [I]-3, 1 part by weight of calcium stearate, 1 part by weight of 3,5-di-t-butyl-4-hydroxytoluene, 1 part by weight of tetrakis[methylene(3,5-di-t-butyl-4-hydroxy)hydrocinnamate]methane and 50 parts by weight of a propylene homopolymer [II]-2 (MFR: 7.0 dg/min, residue of extraction by means of boiling heptane: 98.0%) were mixed with each other. The resulting mixture was granulated and pelletized using an extruder of 20 mm$\phi$ to obtain an olefin polymer composition [M-1] for a master batch.

[Preparation of polypropylene composition]

25 parts by weight of the above-obtained composition [M-1] for a master batch, 1 part by weight of calcium stearate, 1 part by weight of 3,5-di-t-butyl-4-hydroxytoluene, 1 part by weight of tetrakis[methylene(3,5-di-t-butyl-4-hydroxy)hydrocinnamate]methane and 1,000 parts by weight of a propylene homopolymer [II] (MFR: 1.5 dg/min, residue of extraction by means of boiling heptane: 98.0%) were mixed with each other. The resulting mixture was granulated and pelletized using an extruder of 20 mm$\phi$.

The melt tension (MT) of the polypropylene composition thus obtained was 1.8 g, and the melt flow rate (MFR) thereof was 1.8 dg/min.

Example 4

[Polymerization of olefin]

Into a 1-liter five-necked glass reactor equipped with a stirrer, 600 ml of purified heptane was charged in a nitrogen atmosphere, and then the temperature in the reactor was raised to 60° C. Subsequently, into the reactor, 30 mmol of triethylaluminum, 3 mmol of cyclohexylmethyldimethoxysilane (CMMS) and 0.6 mmol (in terms of titanium atom) of the prepolymerized catalyst [C]-2 obtained in Example 2 were fed, and then propylene and hydrogen were further fed at feeding rates of 150 liter/hour and 0.2 liter/hour, respectively, to perform a polymerization for 25 minutes. The temperature in the polymerization was kept at 70° C.

The polymerization reaction was terminated by adding a large amount of isobutyl alcohol containing a small amount of a hydrochloric acid, and the gas fed into the reactor was changed to nitrogen. The resulting mixture was stirred for 30 minutes at 60° C. to remove a catalyst residue.

After the stirring was completed, a slurry containing the produced solid was filtered thereby to separate a polymer from the slurry. The polymer was dried at 70° C. under a reduced pressure to obtain 90.5 g of an propylene/polyene copolymer-containing polymer

[I]-4. The melt flow rate (MFR) of the propylene/polyene copolymer-containing polymer [I]-4 was 7.6 dg/min. The melt tension of the propylene/polyene copolymer-containing polymer [I]-4 was 7.3 g.

The propylene/polyene copolymer-containing polymer [I]-4 obtained as above had a composition comprising an propylene/polyene copolymer in an amount of 28.2% by weight and an olefin polymer in an amount of 71.8% by weight.

[Preparation of polypropylene composition for master batch]

50 parts by weight of the above-obtained propylene/polyene copolymer-containing polymer [I]-4, 1 part by weight of calcium stearate, 1 part by weight of 3,5-di-t-butyl-4-hydroxytoluene, 1 part by weight of tetrakis[methylene (3,5-di-t-butyl-4-hydroxy)hydrocinnamate]methane and 50 parts by weight of a propylene homopolymer [II]-2 (MFR: 7.0 dg/min, residue of extraction by means of boiling heptane: 98.0%) were mixed with each other. The resulting mixture was granulated and pelletized using an extruder of 20 mm$\phi$ to obtain an olefin polymer composition [M-2] for a master batch.

[Preparation of polypropylene composition]

21.8 parts by weight of the above-obtained composition [M-2] for a master batch, 1 part by weight of calcium stearate, 1 part by weight of 3,5-di-t-butyl-4-hydroxytoluene, 1 part by weight of tetrakis[methylene(3,5-di-t-butyl-4-hydroxy)hydrocinnamate]methane and 1,000 parts by weight of a propylene homopolymer [II] (MFR: 1.5 dg/min, residue of extraction by means of boiling heptane: 98.0%) were mixed with each other. The resulting mixture was granulated and pelletized using an extruder of 20 mm$\phi$.

The melt tension (MT) of the polypropylene composition thus obtained was 1.7 g, and the melt flow rate (MFR) thereof was 1.8 dg/min.

Example 5

[Polymerization of olefin]

Into a 1-liter five-necked glass reactor equipped with a stirrer, 600 ml of purified heptane was charged in a nitrogen atmosphere, and then the temperature in the reactor was raised to 60° C. Subsequently, into the reactor, 30 mmol of triethylaluminum, 30 mmol of cyclohexylmethyldimethoxysilane (CMMS) and 0.6 mmol (in terms of titanium atom) of the above-obtained prepolymerized catalyst [C]-1 were fed, and then propylene, ethylene and hydrogen were further fed at feeding rates of 150 liter/hour, 9.6 liter/hour and 0.2 liter/hour, respectively, to perform a polymerization for 60 minutes. The temperature in the polymerization was kept at 60° C.

The polymerization reaction was terminated by adding a large amount of isobutyl alcohol containing a small amount of a hydrochloric acid, and the gas fed into the reactor was changed to nitrogen. The resulting mixture was stirred for 30 minutes at 60° C. to remove a catalyst residue.

After the stirring was completed, a slurry containing the produced solid was filtered thereby to separate a polymer from the slurry. The polymer was dried at 70° C. under a reduced pressure to obtain 72.4 g of an ethylene/polyene copolymer-containing polymer [I]-5. The melt flow rate (MFR) of the ethylene/polyene copolymer-containing polymer [I]-5 was 7.1 dg/min. The melt tension of the ethylene/polyene copolymer-containing polymer [I]-5 was 7.7 g.

The ethylene/polyene copolymer-containing polymer [I]-5 obtained as above had a composition comprising an ethylene/polyene copolymer in an amount of 34.9% by weight and an olefin polymer in an amount of 65.1% by weight.

[Preparation of polypropylene composition]

21.8 parts by weight of the above-obtained ethylene/polyene copolymer-containing polymer [I]-5, 1 part by weight of calcium stearate, 1 part by weight of 3,5-di-t-butyl-4-hydroxytoluene, 1 part by weight of tetrakis[methylene(3,5-di-t-butyl-4-hydroxy)hydrocinnamate]methane and 1,000 parts by weight of a propylene homopolymer [II] (MFR: 1.5 dg/min, residue of extraction by means of boiling heptane: 98.0%) were mixed with each other. The resulting mixture was granulated and pelletized using an extruder of 20 mm$\phi$.

The melt tension (MT) of the polypropylene composition thus obtained was 1.9 g, and the melt flow rate (MFR) thereof was 1.7 dg/min.

Example 6

[Polymerization of olefin]

Into a 1-liter five-necked glass reactor equipped with a stirrer, 600 ml of purified heptane was charged in a nitrogen atmosphere, and then the temperature in the reactor was raised to 60° C. Subsequently, into the reactor, 30 mmol of triethylaluminum, 3 mmol of cyclohexylmethyldimethoxysilane (CMMS) and 0.6 mmol (in terms of titanium atom) of the above-obtained prepolymerized catalyst [C]-1 were fed, and then propylene and hydrogen were further fed at feeding rates of 150 liter/hour and 0.2 liter/hour, respectively, to perform a polymerization for 25 minutes. The temperature in the polymerization was kept at 70° C.

Thereafter the feeding of hydrogen was stopped and then the feeding rate of propylene was changed to 100 liter/hour and ethylene was fed together with the propylene at feeding rate of 100 liter/hour to perform a copolymerization for 15 minutes.

The polymerization reaction was terminated by adding a large amount of isobutyl alcohol containing a small amount of a hydrochloric acid, and the gas fed into the reactor was changed to nitrogen. The resulting mixture was poured into a 5-liter beaker containing 2 liters of methanol and 2 liters of acetone and was stirred for 15 minutes to remove a catalyst residue.

After the stirring was completed, a slurry containing the produced solid was filtered thereby to separate a polymer from the slurry. The polymer was dried at 70° C. under a reduced pressure to obtain 132.6 g of an ethylene/polyene copolymer-containing polymer [I]-6. The melt flow rate (MFR) of the ethylene/polyene copolymer-containing polymer [I]-6 was 6.2 dg/min. The melt tension (MT) of the ethylene/polyene copolymer-containing polymer [I]-6 was 8.0 g.

The ethylene/polyene copolymer-containing polymer [I]-6 obtained as above had a composition comprising an ethylene/polyene copolymer in an amount of 19.1% by weight and an olefin polymer in an amount of 80.9% by weight.

[Preparation of polypropylene composition]

21.8 parts by weight of the above-obtained ethylene/polyene copolymer-containing polymer [I]-6, 1 part by weight of calcium stearate, 1 part by weight of 3,5-di-t-butyl-4-hydroxytoluene, 1 part by weight of tetrakis[methylene(3,5-di-t-butyl-4-hydroxy)hydrocinnamate]methane and 1,000 parts by weight of a propylene homopolymer [II] (MFR: 1.5 dg/min, residue of extraction by means of boiling heptane: 98.0%) were mixed with each other. The resulting mixture was granulated and pelletized using an extruder of 20 mm$\phi$.

The melt tension (MT) of the polypropylene composition thus obtained was 1.9 g, and the melt flow rate (MFR) thereof was 1.8 dg/min.

Example 7

[Preparation of prepolymerized catalyst [B]-2]

Into a 400 ml four-necked glass reactor equipped with a stirrer, 200 ml of purified decane, 48 mmol of triethylaluminum, 9.6 mmol of trimethyl methoxy silane (TMMS) and 2.0 mmol (in terms of titanium atom) of the above-obtained solid titanium catalyst component [A] were charged in a nitrogen atmosphere. Then, into the reactor was further fed 120 ml of 3-methyl-1-butene at 20° C. to react for 24 hours.

When the react was completed, the reactor was purged with nitrogen, and a washing operation consisting of removal of the supernatant liquid and addition of purified hexane was carried out twice. Thereafter, the obtained reaction liquid was suspended again using purified hexane, and all of the resulting suspension was transferred into a catalyst bottle to obtain a prepolymerized catalyst [B]-2.

[Copolymerization of ethylene and polyene]

Into a 400 ml four-necked glass reactor equipped with a stirrer, 334 ml of purified hexane, 2 ml of 1,9-decadiene, 10 mmol of diethylaluminum chloride and 1.0 mmol (in terms of titanium atom) of the above-obtained prepolymerized catalyst [B]-2 were charged in a nitrogen atmosphere. Then, into the reactor was further fed ethylene at 0° C., and feeding of the ethylene was terminated when the ethylene was reacted in an amount of 28 liters.

When the feeding of ethylene was completed, the reactor was purged with nitrogen, and then 5 ml of the resulting slurry was sampling out to measure a conversion of 1,9-decadiene, and thereafter a washing operation consisting of removal of the supernatant liquid and addition of purified hexane was carried out twice. Thereafter, the obtained reaction liquid was suspended again using purified hexane, and all of the resulting suspension was transferred into a catalyst bottle to obtain a prepolymerized catalyst [C]-7 containing an ethylene/polyene copolymer (i).

In the prepolymerized catalyst [C]-7 thus obtained, an ethylene/1,9-decadiene copolymer was produced in an amount of 15.3 g based on 1 g of the transition metal compound catalyst component.

Further the conversion of 1,9-decadiene was 51 mol % and therefore the ethylene/1,9-decadiene copolymer contains constituent units derived from ethylene in an amount of 9.48 mol % and constituent units derived from 1,9-decadiene in an amount of 0.52 mol %.

[Polymerization of olefin]

Into a 1-liter autoclave equipped with a stirrer, 500 ml of purified 4-methyl-1-pentene was charged in a nitrogen atmosphere, and the temperature in the reactor was kept at room temperature. Subsequently, into the reactor, 75 mmol of triethylaluminum, 75 mmol of trimethyl methoxy silane (TMMS) and 0.6 mmol (in terms of titanium atom) of the above-obtained prepolymerized catalyst [C]-7 were fed, and then 500 ml of hydrogen was further fed to perform a polymerization for 10 minutes. The temperature in the polymerization was kept at 50° C.

The polymerization reaction was terminated by adding a large amount of isobutyl alcohol containing a small amount of a hydrochloric acid, and the gas fed into the reactor was changed to nitrogen. The resulting mixture was stirred for 30 minutes at 60° C. to remove a catalyst residue.

After the stirring was completed, a slurry containing the produced solid was filtered thereby to separate a polymer from the slurry. The polymer was dried at 100° C. under a reduced pressure to obtain 202.3 g of an ethylene/polyene copolymer-containing polymer [I]-7. The melt flow rate (MFR) of the ethylene/polyene copolymer-containing polymer [I]-7 was 0.8 dg/min. The melt tension (MT) of the ethylene/polyene copolymer-containing polymer [I]-7 was 36.8 g.

The ethylene/polyene copolymer-containing polymer [I]-7 obtained as above had a composition comprising an ethylene/polyene copolymer in an amount of 12.6% by weight and an olefin polymer in an amount of 87.4% by weight.

[Preparation of polypropylene composition]

50 parts by weight of the above-obtained ethylene/polyene copolymer-containing polymer [I]-7, 1 part by weight of calcium stearate, 1 part by weight of 3,5-di-t-butyl-4-hydroxytoluene, 1 part by weight of tetrakis[methylene (3,5-di-t-butyl-4-hydroxy)hydrocinnamate]methane and 1,000 parts by weight of poly-4-methyl-1-pentene [II]-7 (MFR: 1.2 dg/min, residue of extraction by means of boiling heptane: 98.0%) were mixed with each other. The resulting mixture was granulated and pelletized using an extruder of 20 mm$\phi$.

The melt tension (MT) of the polypropylene composition thus obtained was 12.6 g, and the melt flow rate (MFR) thereof was 1.2 dg/min.

Comparative Example 1

The melt tension (MT) of the polypropylene [II] used in Example 1 and Example 2 was 1.4 g.

Comparative Example 2

The melt tension (MT) of the poly-4-methyl-1-pentene [II]-7 used in Example 7 was 10.4 g.

Comparative Example 3

[Copolymerization of ethylene and polyene]

Into a 400 ml four-necked glass reactor equipped with a stirrer, 300 ml of purified 1,9-decadiene, 10 mmol of diethylaluminum chloride and 1.0 mmol (in terms of titanium atom) of the above-obtained prepolymerized catalyst [B]-1 were charged in a nitrogen atmosphere. Then, into the reactor was further fed ethylene at 0° C., and feeding of the ethylene was conducted at a feeding rate of 7 liter/hour for 4 hours.

When the feeding of ethylene was completed, the reactor was purged with nitrogen, and then the resulting slurry was filtered off to measure an unreacted 1,9-decadiene, and thereafter a washing operation consisting of removal of the supernatant liquid and addition of purified hexane was carried out twice. Thereafter, the obtained reaction liquid was suspended again using purified hexane, and all of the resulting suspension was transferred into a catalyst bottle to obtain a prepolymerized catalyst [C]-8 containing an ethylene/polyene copolymer (i).

In the prepolymerized catalyst [C]-8 thus obtained, an ethylene/1,9-decadiene copolymer was produced in an amount of 14.9 g based on 1 g of the transition metal compound catalyst component.

Further the conversion of 1,9-decadiene was 5.6 mol % and therefore the ethylene/1,9-decadiene copolymer contains constituent units derived from ethylene in an amount of 47.3 mol % and constituent units derived from 1,9-decadiene in an amount of 52.7 mol %.

[Polymerization of olefin]

Into a 1-liter five-necked glass reactor equipped with a stirrer, 600 ml of purified heptane was charged in a nitrogen atmosphere, and then the temperature in the reactor was raised to 60° C. Subsequently, into the reactor, 30 mmol of triethylaluminum, 3 mmol of cyclohexylmethyldimethoxysilane (CMMS) and 0.6 mmol (in terms of titanium atom) of the above-obtained prepolymerized catalyst [C]-8 were fed, and then propylene and hydrogen were further fed at feeding rates of 150 liter/hour and 0.2 liter/hour, respectively, to perform a polymerization for 60 minutes. The temperature in the polymerization was kept at 70° C.

The polymerization reaction was terminated by adding a large amount of isobutyl alcohol containing a small amount of a hydrochloric acid, and the gas fed into the reactor was changed to nitrogen. The resulting mixture was stirred for 30 minutes at 60° C. to remove a catalyst residue.

After the stirring was completed, a slurry containing the produced solid was filtered thereby to separate a polymer from the slurry. The polymer was dried at 70° C. under a reduced pressure to obtain 121.6 g of an ethylene/polyene copolymer-containing polymer [I]-8. The melt flow rate (MFR) of the ethylene/polyene copolymer-containing polymer [I]-8 was 10.7 dg/min. The melt tension of the ethylene/polyene copolymer-containing polymer [I]-8 was 0.25 g.

The ethylene/polyene copolymer-containing polymer [I]-8 obtained as above had a composition comprising an ethylene/polyene copolymer in an amount of 15.1% by weight and an olefin polymer in an amount of 84.9% by weight.

[Preparation of polypropylene composition]

21.8 parts by weight of the above-obtained ethylene/polyene copolymer-containing polymer [I]-8, 1 part by weight of calcium stearate, 1 part by weight of 3,5-di-t-butyl-4-hydroxytoluene, 1 part by weight of tetrakis[methylene(3,5-di-t-butyl-4-hydroxy)hydrocinnamate]methane and 1,000 parts by weight of a propylene homopolymer [II] (MFR: 1.5 dg/min, residue of extraction by means of boiling heptane: 98.0%) were mixed with each other. The resulting mixture was granulated and pelletized using an extruder of 20 mmφ.

The melt tension (MT) of the polypropylene composition thus obtained was 1.1 g, and the melt flow rate (MFR) thereof was 1.8 dg/min.

Comparative Example 4

[Copolymerization of ethylene and polyene]

Into a 400 ml four-necked glass reactor equipped with a stirrer, 300 ml of purified 1,9-decadiene, 10 mmol of diethylaluminum chloride and 1.0 mmol (in terms of titanium atom) of the above-obtained prepolymerized catalyst [B]-1 were charged in a nitrogen atmosphere. Then, the resulting slurry was stirred at 0° C. for 4 hours.

When the feeding of ethylene was completed, the reactor was purged with nitrogen, and then the slurry thus obtained was filtered off to measure an unreacted 1,9-decadiene. The conversion of 1,9-decadiene was 0.8 mol %. Further a washing operation consisting of removal of the supernatant liquid and addition of purified hexane was carried out twice. Thereafter, the obtained reaction liquid was suspended again using purified hexane, and all of the resulting suspension was transferred into a catalyst bottle to obtain a prepolymerized catalyst [C]-9 containing a polyene homopolymer (i).

In the prepolymerized catalyst [C]-9 thus obtained, a 1,9-decadiene homopolymer was produced in an amount of 1.8 g based on 1 g of the transition metal compound catalyst component.

[Polymerization of olefin]

Into a 1-liter five-necked glass reactor equipped with a stirrer, 600 ml of purified heptane was charged in a nitrogen atmosphere, and then the temperature in the reactor was raised to 60° C. Subsequently, into the reactor, 30 mmol of triethylaluminum, 3 mmol of cyclohexylmethyldimethoxysilane (CMMS) and 0.6 mmol (in terms of titanium atom) of the above-obtained prepolymerized catalyst [C]-9 were fed, and then propylene and hydrogen were further fed at feeding rates of 150 liter/hour and 0.2 liter/hour, respectively, to perform a polymerization for 60 minutes. The temperature in the polymerization was kept at 70° C.

The polymerization reaction was terminated by adding a large amount of isobutyl alcohol containing a small amount of a hydrochloric acid, and the gas fed into the reactor was changed to nitrogen. The resulting mixture was stirred for 30 minutes at 60° C. to remove a catalyst residue.

After the stirring was completed, a slurry containing the produced solid was filtered thereby to separate a polymer from the slurry. The polymer was dried at 70° C. under a reduced pressure to obtain 78.8 g of a 1,9-decadiene homopolymer-containing polymer [I]-9. The melt flow rate (MFR) of the ethylene/polyene copolymer-containing polymer [I]-9 was 8.1 dg/min. The melt tension of the ethylene/polyene copolymer-containing polymer [I]-9 was 0.30 g.

The 1,9-decadiene homopolymer-containing polymer [I]-9 obtained as above had a composition comprising an ethylene/polyene copolymer in an amount of 10.8% by weight and an olefin polymer in an amount of 89.2% by weight.

[Preparation of polypropylene composition]

21.8 parts by weight of the above-obtained ethylene/polyene copolymer-containing polymer [I]-9, 1 part by weight of calcium stearate, 1 part by weight of 3,5-di-t-butyl-4-hydroxytoluene, 1 part by weight of tetrakis[methylene (3,5-di-t-butyl-4-hydroxy)hydrocinnamate]methane and 1,000 parts by weight of a propylene homopolymer [II] (MFR: 1.5 dg/min, residue of extraction by means of boiling heptane: 98.0%) were mixed with each other. The resulting mixture was granulated and pelletized using an extruder of 20 mmφ.

The melt tension (MT) of the polypropylene composition thus obtained was 1.1 g, and the melt flow rate (MFR) thereof was 1.6 dg/min.

What is claimed is:

1. An α-olefin polymer composition comprising:

[I] an α-olefin/polyene copolymer-containing polymer in an amount of 0.005 to 99% by weight, said α-olefin/polyene copolymer-containing polymer comprising:
 (i) an α-olefin/polyene copolymer, and
 (ii) an olefin polymer; and

[II] an olefin polymer in an amount of 1 to 99.995% by weight wherein the polyene has 7 or more carbon atoms and has an olefinic double bond at both terminals, and the α-olefin/polyene copolymer contains constituent units derived from the α-olefin in an amount of 99.999 to 70 mol % and contains constituent units derived from the polyene in an amount of 0.001 to 30 mol %, the olefin polymer (ii) is a polymer of olefin having 3 or more carbon atoms, the α-olefin/polyene copolymer-containing polymer [I] contains the α-olefin/polyene copolymer (i) in an amount of 0.001 to 99% by weight and contains the olefin polymer (ii) in an amount of 99.999 to 1% by weight, and the olefin polymer [II] is a polymer of olefin having 3 or more carbon atoms, wherein the melt tension of said α-olefin polymer composition satisfies the following relation:

$$MT > \frac{W_I}{W_I + W_{II}} \times MT_I + \frac{W_{II}}{W_I + W_{II}} \times MT_{II}$$

wherein

MT is a melt tension of an α-olefin copolymer composition comprising the α-olefin/polyene copolymer-containing polymer [I] and the olefin polymer [II], $MT_I$ is a melt tension of the α-olefin/polyene copolymer-containing polymer [I], $MT_{II}$ is a melt tension of the olefin polymer [II]

$W_I$ is a weight percentage of the α-olefin/polyene copolymer-containing polymer [I], and $W_{II}$ is a weight percentage of the olefin polymer [II].

2. The olefin polymer composition as claimed in claim 1, wherein the α-olefin/polyene copolymer-containing polymer [I] is an α-olefin/polyene copolymer-containing polymer comprising:

the α-olefin/polyene copolymer (i) in an amount of 0.001 to 15% by weight, and the olefin polymer (ii) in an amount of 99.999 to 85% by weight.

3. The olefin polymer composition as claimed in claim 1 or claim 2, wherein the α-olefin/polyene copolymer-containing polymer [I] is an α-olefin/polyene copolymer-containing polymer obtained by polymerizing or copolymerizing olefin to a prepolymerized catalyst to form the olefin polymer (ii), said prepolymerized catalyst comprising the α-olefin/polyene copolymer (i) obtained by copolymerizing an α-olefin and a polyene to a catalyst comprising

[A] a transition metal compound catalyst component, and

[B] an organometallic compound catalyst component containing a metal selected from metals in Group I to Group III of the periodic table, in the total amounts of the α-olefin and the polyene of 0.01 to 2,000 g per 1 g of the transition metal compound catalyst component [A].

4. The olefin polymer composition as claimed in claim 3, wherein the transition metal compound catalyst component [A] is a compound containing at least one transition metal selected from Ti, Zr, Hf, Nb, Ta, Cr and V.

5. The olefin polymer composition as claimed in claim 3, wherein the transition metal compound catalyst component [A] is a solid titanium catalyst component containing titanium and halogen.

6. The olefin polymer composition as claimed in claim 3, wherein the transition metal compound catalyst component [A] is a metallocene compound containing a ligand having a cyclopentadienyl skeleton.

7. The olefin polymer composition as claimed in claim 1, wherein the polyene is an aliphatic polyene compound having an olefinic double bond at the both terminals and has 7 or more carbon atoms.

8. A vacuum molded product or an air-pressure molded product comprising the olefin polymer composition as claimed in claim 1.

9. A blow molded product comprising the olefin polymer composition as claimed in claim 1.

10. A foamed product comprising the olefin polymer composition as claimed in claim 1.

11. A calendered product comprising the olefin polymer composition as claimed in claim 1.

12. An inflation film comprising the olefin polymer composition as claimed in claim 1.

13. An extruded product comprising the olefin polymer composition as claimed in claim 1.

14. A stretched product comprising the olefin polymer composition as claimed in claim 1.

15. An olefin polymer composition for a master batch comprising:

[I] an α-olefin/polyene copolymer-containing polymer in an amount of 0.005 to 99% by weight, said α-olefin/polyene copolymer-containing polymer comprising:

(i) an α-olefin/polyene copolymer in an amount of 15 to 99% by weight, and (ii) an olefin polymer in an amount of 85 to 1% by weight; and

[II] an olefin polymer in an amount of 99.995 to 1% by weight wherein the polyene has 7 or more carbon atoms and has an olefinic double bond at both terminals, and the α-olefin/polyene copolymer contains constituent units derived from the α-olefin in an amount of 99.999 to 70 mol % and contains constituent units derived from the polyene in an amount of 0.001 to 30 mol %, the olefin polymer (ii) is a polymer of olefin having 3 or more carbon atoms, the α-olefin/polyene copolymer-containing polymer [I] contains the α-olefin/polyene copolymer (i) in an amount of 0.001 to 99% by weight and contains the olefin polymer (ii) in an amount of 99.999 to 1% by weight, and the olefin polymer [II] is a polymer of olefin having 3 or more carbon atoms, wherein the melt tension of said α-olefin polymer composition satisfies the following relation:

$$MT > \frac{W_I}{W_I + W_{II}} \times MT_I + \frac{W_{II}}{W_I + W_{II}} \times MT_{II}$$

wherein

MT is a melt tension of an α-olefin copolymer composition comprising the α-olefin/polyene copolymer-containing polymer [I] and the olefin polymer [II], $MT_I$ is a melt tension of the α-olefin/polyene copolymer-containing polymer [I], $MT_{II}$ is a melt tension of the olefin polymer [II]

$W_I$ is a weight percentage of the α-olefin/polyene copolymer-containing polymer [I], and $W_{II}$ is a weight percentage of the olefin polymer [II].

16. The olefin polymer composition for a master batch as claimed in claim 15, wherein the α-olefin/polyene copolymer-containing polymer is an α-olefin/polyene copolymer-containing polymer obtained by polymerizing or copolymerizing olefin to a prepolymerized catalyst to form the olefin polymer (ii), said prepolymerized catalyst comprising the α-olefin/polyene copolymer (i) obtained by copolymerizing an α-olefin and a polyene to a catalyst comprising

[A] a transition metal compound catalyst component, and

[B] an organometallic compound catalyst component containing a metal selected from metals in Group I to Group III of the periodic table, in the total amounts of the α-olefin and the polyene of 0.01 to 2,000 g per 1 g of the transition metal compound catalyst component [A].

* * * * *